United States Patent
Wood et al.

(10) Patent No.: US 10,963,596 B1
(45) Date of Patent: Mar. 30, 2021

(54) SYSTEMS AND METHODS FOR CAD AUTOMATION

(71) Applicant: ATLATL Software, Inc., Charleston, SC (US)

(72) Inventors: Eric Wood, Charleston, SC (US); John Cater, Charleston, SC (US)

(73) Assignee: ATLATL SOFTWARE, INC., Charleston, SC (US)

( * ) Notice: Subject to any disclaimer, the term of this patent is extended or adjusted under 35 U.S.C. 154(b) by 0 days.

(21) Appl. No.: 16/157,892

(22) Filed: Oct. 11, 2018

Related U.S. Application Data

(63) Continuation-in-part of application No. 16/129,196, filed on Sep. 12, 2018, now Pat. No. 10,650,611.

(60) Provisional application No. 62/570,715, filed on Oct. 11, 2017, provisional application No. 62/557,475, filed on Sep. 12, 2017.

(51) Int. Cl.
   | | |
   |---|---|
   | *G06T 19/20* | (2011.01) |
   | *G06T 19/00* | (2011.01) |
   | *G06T 17/00* | (2006.01) |
   | *G06F 30/00* | (2020.01) |

(52) U.S. Cl.
   CPC .............. *G06F 30/00* (2020.01); *G06T 19/20* (2013.01)

(58) Field of Classification Search
   None
   See application file for complete search history.

(56) References Cited

U.S. PATENT DOCUMENTS

| | | |
|---|---|---|
| 7,028,902 B2 | 4/2006 | Xu et al. |
| 7,823,784 B2 | 11/2010 | Matsumoto |
| 7,900,847 B2 | 3/2011 | Lindahl et al. |
| 8,098,408 B2 | 1/2012 | Sawada et al. |
| 8,584,931 B2 | 11/2013 | Kim |
| 8,606,645 B1 | 12/2013 | Applefeld |
| 8,645,220 B2 | 2/2014 | Harper |
| 8,950,673 B2 | 2/2015 | Madej |
| 9,058,764 B1 | 6/2015 | Persson |
| 9,365,035 B2 | 6/2016 | Jintsugawa et al. |
| 9,449,342 B2 | 9/2016 | Sacco |
| 9,667,716 B2 | 5/2017 | Eggert |
| 9,912,555 B2 | 3/2018 | Oshiba |
| 10,147,028 B2 | 12/2018 | Ito |
| 2003/0217329 A1 | 11/2003 | Good |
| 2005/0099442 A1 | 5/2005 | Payne |
| 2005/0234835 A1 | 10/2005 | Stonoha |
| 2006/0038833 A1 | 2/2006 | Mallinson et al. |

(Continued)

*Primary Examiner* — Tize Ma
(74) *Attorney, Agent, or Firm* — Morris, Manning & Martin, LLP; Bryan D. Stewart; Daniel T. Begasse

(57) ABSTRACT

Systems and methods for creating, storing, and manipulating 3D objects in a software-supported virtual environment, and furthermore automatically generating the 3D objects in a CAD software application, are disclosed. The systems and methods allow for assemblies of the 3D objects to be saved and exported, where the saved assemblies are then imported by the CAD software application. The CAD software application includes a plug-in for generating part instances corresponding to each 3D object of the saved assembly. The plug-in includes master part models that define how the part instances are represented in the CAD software application, and how each part instance is to be connected for creating the saved assemblies in the CAD software application.

20 Claims, 20 Drawing Sheets

(56) References Cited

U.S. PATENT DOCUMENTS

| | | |
|---|---|---|
| 2006/0086811 A1 | 4/2006 | Yoshida et al. |
| 2007/0038944 A1 | 2/2007 | Carignano |
| 2007/0086638 A1 | 4/2007 | Ackley |
| 2008/0183483 A1* | 7/2008 | Hart .................. G06F 30/13 705/1.1 |
| 2009/0132371 A1 | 5/2009 | Strietzel |
| 2009/0255993 A1 | 10/2009 | Barber |
| 2012/0199647 A1 | 8/2012 | Hwang et al. |
| 2013/0111330 A1 | 5/2013 | Staikos |
| 2014/0071467 A1 | 3/2014 | Asada |
| 2014/0203071 A1 | 7/2014 | Eggert |
| 2014/0280832 A1 | 9/2014 | Oshiba |
| 2014/0282398 A1 | 9/2014 | Podolyak |
| 2014/0304578 A1 | 10/2014 | Parkinson et al. |
| 2014/0364092 A1 | 12/2014 | Rose |
| 2014/0379309 A1* | 12/2014 | Banta .................. G06F 17/50 703/1 |
| 2015/0293525 A1* | 10/2015 | Yamamoto ............ G06T 19/20 702/182 |
| 2016/0019407 A1 | 1/2016 | Yoshida |
| 2016/0180136 A1 | 6/2016 | Meier |
| 2016/0189016 A1 | 6/2016 | Windmueller |
| 2016/0246899 A1* | 8/2016 | Hirschtick .......... G06F 17/5086 |
| 2017/0066092 A1* | 3/2017 | Yamamoto ............ B23P 21/00 |
| 2017/0212500 A1* | 7/2017 | Dostert ............ G05B 19/4097 |
| 2019/0042667 A1* | 2/2019 | Amadon ................ G06T 19/20 |

* cited by examiner

SYSTEMS AND METHODS FOR CAD AUTOMATION

CROSS REFERENCE TO RELATED APPLICATIONS

This application:
claims the benefit of and priority to U.S. Provisional Patent App. No. 62/570,715, filed on Oct. 11, 2017, and entitled "CAD AUTOMATION;"
is a continuation-in-part application of U.S. patent application Ser. No. 16/129,196, filed on Sep. 12, 2018, and entitled "SYSTEMS AND METHODS FOR GRAPHICAL PROGRAMMING," which claims the benefit of and priority to U.S. Provisional Patent App. 62/557,475, filed on Sep. 12, 2017, and entitled "CREATION GRAPH;" and
incorporates by reference each of the above applications as if the same were included herein in their entireties.

BACKGROUND

Generally, conventional 3D programming systems require a final render or build of the configuration files prior to presenting 3D displays. These 3D displays may allow for user interaction, however, any changes or adjustments to the 3D displays require a re-render, rebuild, or overall release of a new version of the 3D displays to incorporate the changes or adjustments. These traditional programming methods are inefficient and cumbersome for producing 3D and visual item-configurable systems. Furthermore, conventional 3D programming systems are "light-weight," such that they do not include the full capabilities of CAD software applications and platforms, and their functionality generally begins and ends with generating 3D displays. Therefore, there exists a long-felt but unresolved need for systems and methods that allow for "on the fly" configuration and dynamic adjustments to 3D displays, without the need to manually re-code and rebuild the files supporting the 3D displays, that furthermore allow for those 3D displays to streamline workflow tasks in CAD software applications.

BRIEF SUMMARY OF THE DISCLOSURE

The present disclosure relates generally to systems and methods that enable efficient creation, storage, and updates to item behavior without having to re-render a current three-dimensional configuration or release a new version of the configuration, and furthermore allow for importing the three-dimensional configuration into a CAD software application for automatically building/assembling the configuration. In particular, in various embodiments, the systems and methods disclosed herein are directed to: 1) an improvement to visual programming systems and methods, which enables the visual organization of predefined portions of functionality and logic to define product behavior; 2) an improved data solution that stores behavior information in an item agnostic way and enables an application to load and manipulate product properties dynamically at runtime; and 3) an improvement to building models in CAD software applications.

The systems and methods disclosed herein may be used within the context of a 3D configurator sales tool (e.g., a mobile application) that allows a user to build and configure 3D items, parts, products, and assemblies "on the fly." Each item, part, object, and/or product may have its own parameters based on a company's inventory, production abilities, the item's own physical constraints, etc. These parameters may be programmed and uploaded to an application from a centralized cloud repository, or other appropriate remote storage system. When these part/product parameters are changed or updated, it may be advantageous to have a system that allows for visual programming and organization of pre-defined portions of functionality, which helps to eliminate modifying the original code base and reduces time and effort by shorting the quality control aspects of these changes (e.g., only the changes need to be run through quality control, not the entire code base). Further, with the disclosed systems and methods, a single application can load updated product properties without the need for a re-download, re-install, or re-render of the application.

The present systems and methods are directed towards improvements to a computer-related technology, namely, a graphical/visual programming system and methods that "split" certain aspects and behaviors of a particular item/part/product into different assets (files) that are separately downloaded and combined by a 3D configurator application. According to some aspects of the present systems and methods, splitting certain aspects and behaviors of a particular item/part/product may allow the properties of the item/part/product to be separately updated without requiring rewrites/edits to the original (and/or entire) code base for the particular item/part/product.

In a particular embodiment, a user may download an application (3D configurator) on a computing device, such as a tablet computer. The user may then, continuing with this embodiment, input certain credentials corresponding to his/her relationship with a certain company or organization. In this embodiment, based on the user's credentials, the user is granted access to certain configurable items that are pre-configured with certain adjustable parameters. Further, in this embodiment, the 3D configurator may automatically download (or receive for download) certain configurable items for which the user has been granted access. As discussed herein, enabling the user access to certain configurable items via credentials (through the unique architecture, systems, and methods disclosed herein) is an improvement over systems wherein the user has to download a new instance/update of the 3D configurator application each time the configurable items are updated (e.g., the user is granted access to a new item or pre-configured item dimensions are changed).

Furthermore, once a user has logged into a 3D configurator and the 3D configurator has granted the user access to various configurable items (as discussed immediately above), the user can build an assembly "on the fly" and pre-loaded parts can be rotated and various parameters can be adjusted via the 3D configurator downloaded on the computing device. As discussed above and herein, when configurable item parameters are updated (e.g., when a new pipe is added to a company's inventory, when a new available pipe length is added, when a new item type is added, etc.), the systems and methods discussed herein enable more efficient programming of such parameters at a central location (e.g., a creation graph editor) and more efficient dissemination of this updated information to individual applications that are part of the overall system.

According to various aspects of the present disclosure, the user may also select (within the 3D configurator application) to save and export 3D configurations/assemblies for subsequently building the 3D configuration in a CAD software application or platform. In one embodiment, the saved and exported 3D configurations may be transformed into a platform agnostic data format (such as JSON), where this platform agnostic data includes the part information (e.g., part dimensions, orientations, neighboring/connected parts, etc.) representative of each individual part in the saved 3D configuration. In a particular embodiment, this platform agnostic data format may be consumed by a plug-in at a CAD software application (either on the user's computing device, or on another device). In certain embodiments, the plug-in at the CAD software application may include one or more master part models, where the one or more master models include instructions or templates for generating (via the plug-in) instances of CAD parts that resemble each part from the 3D configuration based on the part information included or defined by the platform agnostic data. Furthermore, in various embodiments, the plug-in may automatically, and without human intervention, assemble the part instances such that the saved 3D configuration is recreated within the CAD software application.

This functionality provides improvements over conventional systems, such that the systems and methods described herein automatically size the parts and items of a 3D configuration, automatically align the parts and items such that they are oriented in appropriate planes, and automatically connect the parts and items for building the 3D configuration within the CAD software, all without substantial human intervention. In particular embodiments, this functionality reduces the time required to build a corresponding CAD model of a 3D configuration, reduces the risk of human error, and streamlines the process of physically building the 3D configurations.

According to a first aspect, a method for automatically building an assembly in a CAD format, the method including: receiving at least one master part model including at least one master model dimension and at least one reference geometry associated with a particular part; receiving configurator data representing an assembly including the particular part, the configurator data including at least one configurator dimension associated with the particular part and information defining a connection between the particular part and at least one other part in the assembly; building a CAD version of the particular part by transforming the at least one configurator dimension into the at least one master model dimension; and building a CAD version of the assembly at least in part by connecting the CAD version of the particular part to a CAD version of the at least one other part in the assembly via the at least one reference geometry.

According to a second aspect, the method of the first aspect or any other aspect, wherein receiving the configurator data representing the assembly includes importing the configurator data from a cloud-based storage location associated with a configurator.

According to a third aspect, the method of the second aspect or any other aspect, wherein importing the configurator data from the cloud-based storage location requires user credentials.

According to a fourth aspect, the method of the first aspect or any other aspect, wherein the reference geometry includes a plane associated with a connection point of the particular part. According to a fifth aspect, the method of the first aspect or any other aspect, wherein the reference geometry includes a plane normal.

According to a sixth aspect, the method of the first aspect or any other aspect, wherein the reference geometry includes an angle mate.

According to a seventh aspect, the method of the first aspect or any other aspect, wherein the information defining a connection between the particular part and at least one other part in the assembly includes an indication of an orientation of the particular part with respect to a reference point of the at least one other part.

According to an eighth aspect, the method of the seventh aspect or any other aspect, the method further including displaying the particular part and the at least one other part in a CAD program.

According to a ninth aspect, the method of the eighth aspect or any other aspect, the method further including displaying the particular part and the at least one other part in a natural orientation, wherein the natural orientation is an orientation of the particular part and the at least one other part as defined by the master model.

According to a tenth aspect, the method of the ninth aspect or any other aspect, the method further including displaying at least one of the particular part and the at least one other part in a second orientation, wherein the second orientation varies from the natural orientation.

According to an eleventh aspect, a system for automatically building an assembly in a CAD program, the system including: a connector plug-in operatively connected to at least one processor and to a CAD program, wherein the connector plug-in transforms configurator data into CAD program data, the connector plug-in configured for: receiving master part models for a plurality of parts from the CAD program, each master part model including one or more master part dimensions and one or more reference geometries; receiving configurator data associated with a configurator assembly created by a configurator and including a particular part of the plurality of parts, the configurator data including at least one configurator dimension associated with the particular part and information defining a connection between the particular part and at least one other part in the configurator assembly; building a CAD version of the particular part by transforming the at least one configurator dimension into at least one master part dimension of the one or more master part dimensions; and automatically building a CAD assembly in the CAD program substantially similar to the configurator assembly at least in part by connecting the CAD version of the particular part to a CAD version of the at least one other part in the configurator assembly via the at least one reference geometry.

According to a twelfth aspect, the system of the eleventh aspect or any other aspect, wherein receiving configurator data associated with the configurator assembly created by the configurator includes importing the configurator data from a cloud-based storage location associated with the configurator.

According to a thirteenth aspect, the system of the twelfth aspect or any other aspect, wherein importing the configurator data from the cloud-based storage location associated with the configurator requires user credentials.

According to a fourteenth aspect, the system of the eleventh aspect or any other aspect, wherein the reference geometry includes a plane associated with a connection point.

According to a fifteenth aspect, the system of the eleventh aspect or any other aspect, wherein the reference geometry includes a plane normal.

According to a sixteenth aspect, the system of the eleventh aspect or any other aspect, wherein the reference geometry includes an angle mate.

According to a seventeenth aspect, the system of the eleventh aspect or any other aspect, wherein a configurator mapping service builds the CAD version of the particular part by transforming the at least one configurator dimension into at least one master part dimension of the one or more master part dimensions.

According to an eighteenth aspect, the system of the eleventh aspect or any other aspect, wherein the connector plug-in is further configured for displaying the CAD version of the particular part and the CAD version of the at least one other part.

According to a nineteenth aspect, the system of the eighteenth aspect or any other aspect, wherein the connector plug-in is further configured for displaying the CAD version of the particular part and the CAD version of the at least one other part in a natural orientation, wherein the natural orientation is an orientation of the CAD version of the particular part and the CAD version of the at least one other part as defined by the master part models.

According to a twentieth aspect, the system of the nineteenth aspect or any other aspect, wherein the connector plug-in is further configured for displaying at least one of the CAD version of the particular part and the CAD version of the at least one other part in a second orientation, wherein the second orientation varies from the natural orientation.

These and other aspects, features, and benefits of the claimed embodiment(s) will become apparent from the following detailed written description of the embodiments and aspects taken in conjunction with the following drawings, although variations and modifications thereto may be effected without departing from the spirit and scope of the novel concepts of the disclosure.

BRIEF DESCRIPTION OF THE DRAWINGS

Further features and benefits of the present disclosure will be apparent from a detailed description of various embodiments thereof taken in conjunction with the following drawings, wherein similar elements are referred to with similar reference numbers, and wherein.

DETAILED DESCRIPTION OF DRAWINGS

Figure 1:
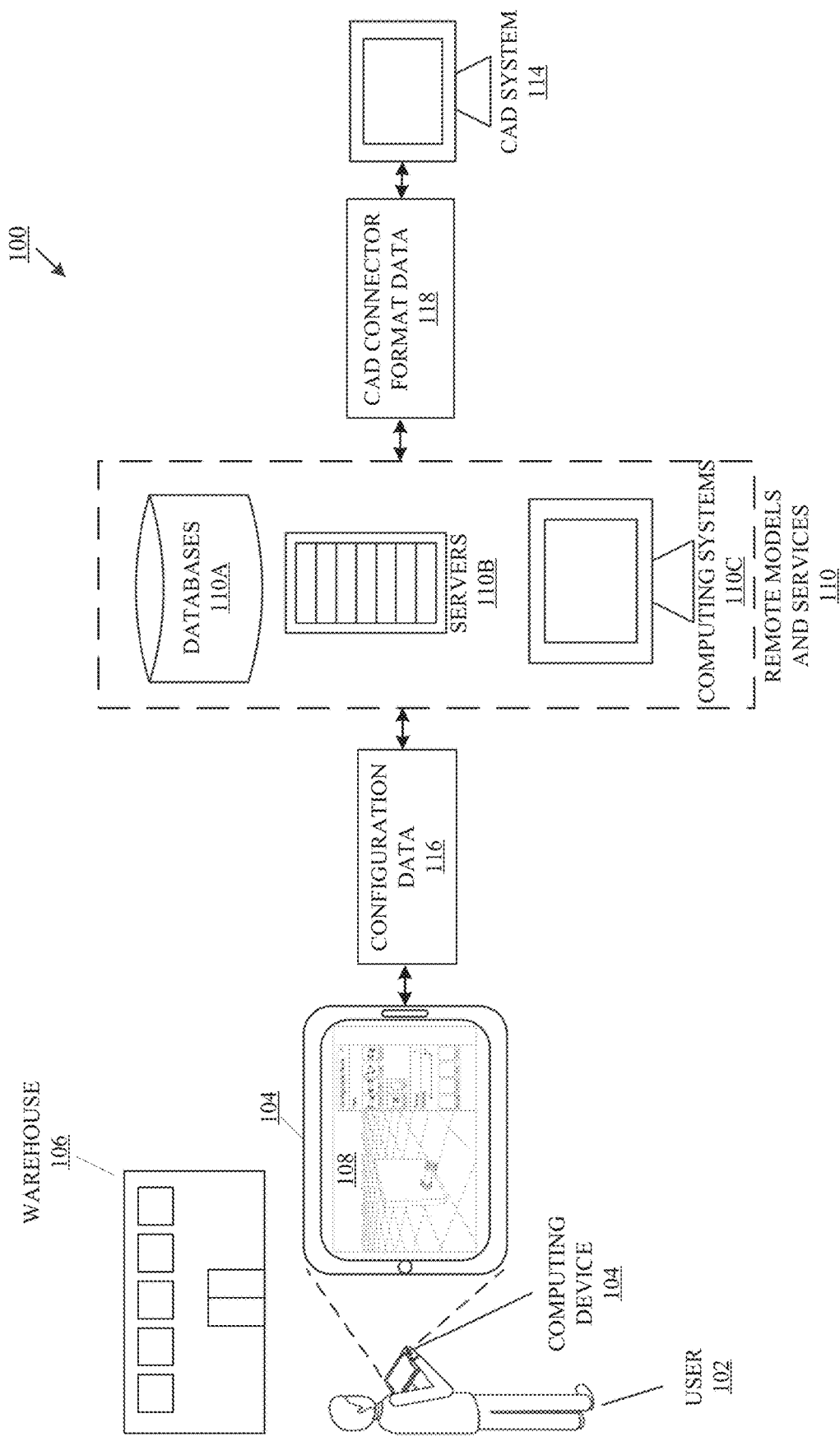
FIG. 1 is an exemplary system environment, according to one aspect of the present disclosure.

The above and further features of the disclosed exemplary systems and methods will be recognized from the following detailed descriptions and drawings of particular embodiments. In various embodiments, the present disclosure relates generally to systems and methods that enable efficient creation, storage, and updates to item behavior without having to re-render a current three-dimensional configuration or release a new version of the configuration, and furthermore allow for importing the three-dimensional configuration into a CAD software application for automatically building/assembling the configuration. In particular, in various embodiments, the systems and methods disclosed herein are directed to: 1) an improvement to visual programming systems and methods, which enables the visual organization of predefined portions of functionality and logic to define product behavior; 2) an improved data solution that stores behavior information in an item agnostic way and enables an application to load and manipulate product properties dynamically at runtime; and 3) an improvement to building models in CAD software applications.

The systems and methods disclosed herein may be used within the context of a 3D configurator sales tool (e.g., a mobile application) that allows a user to build and configure 3D items, parts, products, and assemblies "on the fly." Each item, part, object, and/or product may have its own parameters based on a company's inventory, production abilities, the item's own physical constraints, etc. These parameters may be programmed and uploaded to an application from a centralized cloud repository, or other appropriate remote storage system. When these part/product parameters are changed or updated, it may be advantageous to have a system that allows for visual programming and organization of pre-defined portions of functionality, which helps to eliminate modifying the original code base and reduces time and effort by shorting the quality control aspects of these changes (e.g., only the changes need to be run through quality control, not the entire code base). Further, with the disclosed systems and methods, a single application can load updated product properties without the need for a re-download, re-install, or re-render of the application.

The present systems and methods are directed towards improvements to a computer-related technology, namely, a graphical/visual programming system and methods that "split" certain aspects and behaviors of a particular item/part/product into different assets (files) that are separately downloaded and combined by a 3D configurator application. According to some aspects of the present systems and methods, splitting certain aspects and behaviors of a particular item/part/product may allow the properties of the item/part/product to be separately updated without requiring rewrites/edits to the original (and/or entire) code base for the particular item/part/product.

In a particular embodiment, a user may download an application (3D configurator) on a computing device, such as a tablet computer. The user may then, continuing with this embodiment, input certain credentials corresponding to his/her relationship with a certain company or organization. In this embodiment, based on the user's credentials, the user is granted access to certain configurable items that are pre-configured with certain adjustable parameters. Further, in this embodiment, the 3D configurator may automatically download (or receive for download) certain configurable items for which the user has been granted access. As discussed herein, enabling the user access to certain configurable items via credentials (through the unique architecture, systems, and methods disclosed herein) is an improvement over systems wherein the user has to download a new instance/update of the 3D configurator application each time the configurable items are updated (e.g., the user is granted access to a new item or pre-configured item dimensions are changed).

Furthermore, once a user has logged into a 3D configurator and the 3D configurator has granted the user access to various configurable items (as discussed immediately above), the user can build an assembly "on the fly" and pre-loaded parts can be rotated and various parameters can be adjusted via the 3D configurator downloaded on the computing device. As discussed above and herein, when configurable item parameters are updated (e.g., when a new pipe is added to a company's inventory, when a new available pipe length is added, when a new item type is added, etc.), the systems and methods discussed herein enable more efficient programming of such parameters at a central location (e.g., a creation graph editor) and more efficient dissemination of this updated information to individual applications that are part of the overall system.

According to various aspects of the present disclosure, the user may also select (within the 3D configurator application) to save and export 3D configurations/assemblies for subsequently building the 3D configuration in a CAD software application or platform. In one embodiment, the saved and exported 3D configurations may be transformed into a platform agnostic data format (such as JSON), where this platform agnostic data includes the part information (e.g., part dimensions, orientations, neighboring/connected parts, etc.) representative of each individual part in the saved 3D configuration. In a particular embodiment, this platform agnostic data format may be consumed by a plug-in at a CAD software application (either on the user's computing device, or on another device). In certain embodiments, the plug-in at the CAD software application may include one or more master part models, where the one or more master models include instructions or templates for generating (via the plug-in) instances of CAD parts that resemble each part from the 3D configuration based on the part information included or defined by the platform agnostic data. Furthermore, in various embodiments, the plug-in may automatically, and without human intervention, assemble the part instances such that the saved 3D configuration is recreated within the CAD software application.

This functionality provides improvements over conventional systems, such that the systems and methods described herein automatically size the parts and items of a 3D configuration, automatically align the parts and items such that they are oriented in appropriate planes, and automatically connect the parts and items for building the 3D configuration within the CAD software, all without human intervention. In particular embodiments, this functionality reduces the time required to build a corresponding CAD model of a 3D configuration, reduces the risk of human error, and streamlines the process of physically building the 3D configurations.

Referring now to the drawings, FIG. 1 is an exemplary system environment 100, according to one aspect of the present disclosure. In various embodiments, the systems and methods discussed herein may be implemented as a tool (or system or method), via a mobile application, for allowing real-time design, configuration, visualization, price quoting, etc., of physical items (e.g., pipes or other industrial equipment). In particular, the present systems and methods allow for a user to visually represent a plurality of physical items in a three-dimensional space, configure the plurality of physical items to meet various specifications, design needs, physical constraints, etc., and furthermore receive real-time quote analysis corresponding to the visually represented plurality of items (e.g., quotes for cost, development time, estimated workforce, etc.). According to various aspects of the present disclosure, the system may be implemented in a digital environment (such as on an iPad or other similar mobile computing device), or the system may be implemented in a virtual/augmented reality (AR/VR) environment. As such, a user of the system may remotely configure a plurality of items to be installed at a separate location, or the user may visit the installation location and visually build the plurality of items, via AR/VR, to accommodate the space detected by the AR/VR supported devices.

In a particular embodiment, the exemplary system environment 100 depicts a user 102 holding a computing device 104 at a warehouse 106. In certain embodiments, the user 102 may be a sales representative, and the computing device 104 may be a mobile computing device such as a tablet, smart phone, or any other appropriate device. According to various aspects of the present disclosure, the user 102 may be at the warehouse 106 for scouting the warehouse 106 location and floorplan for designing and quoting a new piping system. In various embodiments, the computing device 104 is operable to run a 3D configurator application 108 (also sometimes referred to herein as a "3D configurator" and "application") for visually displaying the new piping system in real-time. As shown in the present embodiment, the 3D configurator 108 displays the current configuration of the piping system, as well as the available pipe related items (e.g., elbows, T-pipes, end caps, etc.) to add to the currently configured pipe(s). As will be described in greater detail in association with FIGS. 6-10, additional "Configurable Items" or objects from a user interface toolbar of the 3D configurator 108 may be selected by the user 102, and the selected objects may be introduced into the digital environment of the 3D configurator. In certain embodiments, the selected objects/items in the 3D configurator 108 may be visually changed (e.g., rotated, extended, etc.) based on the user's desired configuration or particular limitations, constraints, or requirements for the current configuration (e.g., piping system or the like). In particular embodiments, as the user 102 introduces objects into the 3D configurator, aspects of the system operating in conjunction with the 3D configurator 108, such as remote models and services 110, may respond to the newly introduced or configured objects/items.

In one embodiment, the remote models and services 110 are connected to the user's computing device 104 over a network, and may include various components such as databases 110A, servers 110B, and other computing systems 110C. According to various aspects of the present disclosure, the remote models and services 110 support the 3D configurator 108, such that the visual elements shown on the 3D configurator 108 are received from the remote models and services 110 during an initial logon/setup process, and as the user 102 continues to introduce and adjust configurable items.

For example, consider a scenario where the user 102 is at the warehouse 106 for evaluating the warehouse 106 for a piping system. The user 102 may enter his/her login credentials into the mobile device 104 for launching the 3D configurator 108. In various embodiments, in response to the user 102 providing his/her credentials, the credentials may be transmitted to the remote models and services 110, via the network, for accessing one or more graph files that define behavior such as: 1) what items (e.g., pipes) are available to the user 102 for configuring the pipe system at the warehouse 106, and furthermore the constraints for those items and how they may be configured/manipulated; 2) how the available items are to be displayed within the 3D configurator user interface ("UI"); and 3) how changes to the items in the 3D configurator 108, such as a user 102 changing the length of a particular pipe, affect other items in the 3D configurator, potential items to be introduced into the 3D configurator, pricing quotes for the current item configuration, etc. As will be understood from discussions herein, the system may further locally store the items (e.g., pipes), constraints, display attributes, and the like upon user 102 logging in to the system.

In general, graph files are data objects created for defining relationships between particular items in a network, code, or general system, where each relationship may be represented as connected nodes and where each node may include logic relating to particular inputs, other nodes, external services, etc. According to various aspects of the present disclosure, the graph files discussed herein may be visually programmed via a graph editor. For example, using a graph editor to modify a graph file may allow for a user to introduce a new element into a graph file, such as a new pipe component, by adding a new node to the graph file via the graph editor. In various embodiments, using a graph editor removes the need for manual programming and may promote a more "plug-and-play" environment because the functionality of the system is reliant on properly established relationships between nodes, rather than small details in code.

According to particular embodiments, the graph editor (to be described herein) presents a visual scripting editor that can be used to define item behaviors. In one or more embodiments, item behaviors are defined by three different resources, each created separately via the graph editor. In particular embodiments, the graph editor allows a user to split item behaviors into two or more (e.g., three) different resources, which can then be updated separately (instead of updating all code in an application) and transmitted separately to the 3D configurator 108 (for efficiency). As further discussed below, in various embodiments, an item/item/part/product is defined by: 1) a unified model; 2) a UI model; and 3) a mesh controller, each of which will be discussed in further detail. Each of these resources is combined by the 3D configurator 108 using a common item/item/part/product identifier (discussed below) to control the various aspects the item/item/part/product behavior.

Continuing with FIG. 1, the remote models and services 110 may be operatively connected to a CAD system 114, according to one aspect of the present disclosure. In various embodiments, custom configurations/assemblies (such as a piping system) may be designed on-the-fly within the 3D configurator application 108 as a precursory step to physically building the configurations (e.g., by the user or a separate entity for which the configuration was designed). In particular embodiments, physically building the configurations may require representing the configurations in a separate application or platform (such as a CAD software application or platform) optimized for building mechanical systems (or other systems). In one embodiment, the present systems and methods allow for the configurations built via the 3D configurator 108 to be saved and exported to the remote models and services 110, where the saved and exported 3D configuration data may be transformed into a platform agnostic CAD connector format to be consumed via a CAD plug-in, where the CAD plug-in operates in conjunction with the CAD system 114. In certain embodiments, the CAD plug-in includes predefined models (e.g., master models) that include logic for determining how to generate CAD instances of the individual parts from the exported 3D configuration data, and furthermore how to connect the CAD instances of the individual parts such that the exported 3D configuration can be recreated within the CAD system 114.

As shown in the present embodiment, configuration data 116 is sent from the computing device 104 to the remote models and services 110. According to various aspects of the present disclosure, in addition to supporting the 3D configurator 108 for building configurations and assemblies, the remote models and services 110 may further store the configuration data 116 for exporting the configuration data 116 to external systems (such as the CAD system 114). As will be described in greater detail herein, a plug-in at the CAD system 114 may query the remote models and services 110 for stored 3D configuration data (e.g., the configuration data 116) to be imported into the CAD system 114. In one embodiment, a flexible mapping service included in the plug-in may fetch the configuration data 116 and transform the data into a CAD connector format 118 (e.g., a JSON data format or other platform agnostic format). It should be understood by the discussion herein that the configuration data 116 may be transformed into a CAD connector format 118 at other locations/components, such as local to the computing device 104. In certain embodiments, the CAD connector format 118 includes data (e.g., configured size/length, orientation, neighboring parts, etc.) referencing the individual parts of the 3D configuration and allows for the plug-in at the CAD system 114 to generate one or more part instances (of the individual parts) according to one or more master models.

In various embodiments, the one or more master models include logic for determining how the CAD connector format data 118 is to be represented in the CAD system 114. For example, the one or more master models may include rules (e.g., reference geometries) relating to dimensions or parameters for each part type, such that each part included in the CAD connector format data 118 can be appropriately sized based on the rules. The one or more master models may also include templates for defining features of each part type. For example, the one or more master models may include logic for defining that each elbow pipe includes two planar surfaces for connecting to other parts, and furthermore that the parts should connect at the centers of the planar surfaces. Accordingly, the master models of the CAD system 114, along with other components of the systems discussed herein, provide a technical solution for determining how items defined in the 3D configurator application 108 should be represented in a particular CAD application by "decoupling" the dimension information, size information, orientation information, etc., for each part type from the logic for determining how that information should be represented in the CAD system 114, thus allowing for optimized visualization performance and reducing the need to update visualization data as CAD models are revised.

In one embodiment, and in response to generating the one or more part instances, the CAD system 114, via the plug-in, may furthermore connect and align the part instances such that the connected part instances resemble the 3D configuration. In certain embodiments, connecting the part instances may include automatically aligning the planes and connector points of the generated part instances, such that the part instances connect according to the originally designed 3D configuration and rules defined within the master model, without human interaction or oversight.

Figure 2:
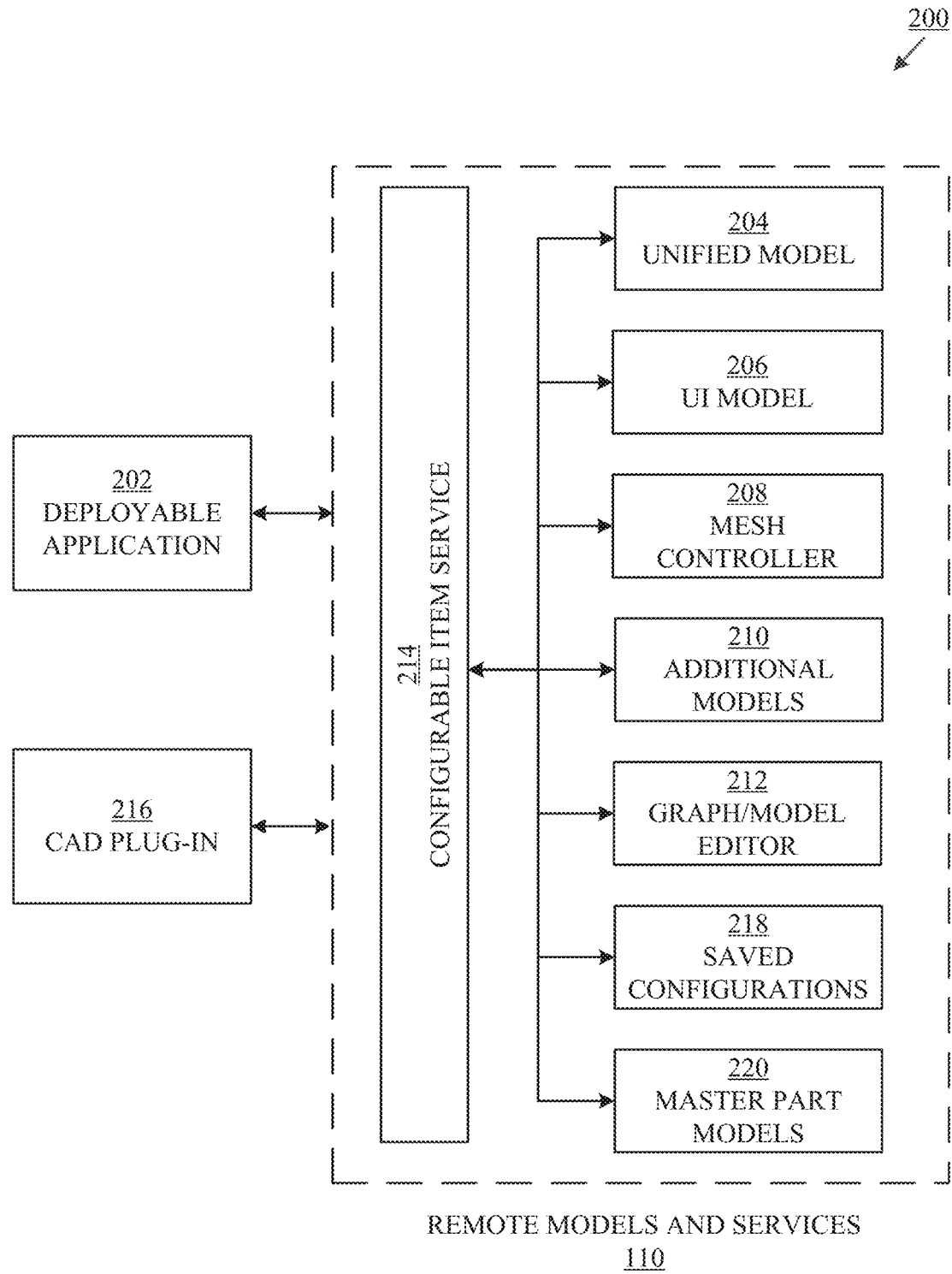
FIG. 2 is an exemplary system diagram, according to one aspect of the present disclosure.

Turning now to FIG. 2, an exemplary architecture diagram 200 is shown, according to one aspect of the present disclosure. As shown in the present embodiment, a deployable application 202 (such as the 3D configurator 108) is shown operatively connected to the remote models and services 110. In the present embodiment, the one or more models of the remote models and services 110 include a unified model 204, a UI model 206, a mesh controller 208, or any number of additional models 210. In various embodiments, the remote models and services 110 may also include a graph/model editor 212 for creating and/or modifying the one or more models. According to various aspects of the present disclosure, the unified model 204, the UI model 206, and the mesh controller 208 are each graph files created by a system administrator (or the like) via a graph editor 212.

According to various embodiments, the unified model 204 defines the various properties and behaviors associated with an item, and provides a data-driven solution to allow the UI model 206 and mesh controller 208 to communicate with each other. In some embodiments, the unified model 204 defines item properties, such as dimensions (e.g., a pipe can be between 4 inches and 4 feet in length and have a diameter of 2 inches or 4 inches).

According to particular embodiments, the UI model 206 defines the user interface associated with an item and how an item is displayed by the 3D configurator 108 (e.g., text boxes, graphic sliders, etc.). In some embodiments, the user interface is driven by the unified model 204 and updates the item data. Available UI elements can be added to a UI model 206 graph (e.g., graph file) through pre-defined nodes via the graph editor 212. In one or more embodiments, the UI model 206 is used by a 3D configurator application 108 at runtime to generate the UI for a selected item. In particular embodiments, the UI model 206 defines user-adjustable features of a visual representation of a particular item/item/part/product.

For example, a node in a graph editor 212 (as discussed below) may define a user-interface element that a user may interact with. Continuing with this example, a node of the UI model 206 for a particular item/part/product defines a user-selectable slider that can be configured to adjust a length of an item/part upon selection by a user (e.g., a user selects a slider and "drags" the slider on a screen of a computing device to visually increase the length of the part). At runtime, in this example, the 3D configurator 108 converts the node instructions to the slider on the screen of a tablet, which, when selected by the user, enables the user to adjust the length of the part.

In particular embodiments, the mesh controller 208 is built in association with an item's 3D art and is used to define how the item's properties drive its 3D representation. In various embodiments, the mesh controller 208 is a graph (e.g., a graph file) created separately from the UI model 206 and unified model 204 graphs and defines how a particular item/item/part/product is visually displayed (e.g., the color of the item/item/part/product, how the item/item/part/product appears when the length is increased, etc.).

As will be understood from discussions herein, in various embodiments, each item/part/product also has its own art resources, which define color and other visual aspects of how the item/part/product is visually rendered on a 3D configurator application 108. In some embodiments, the art resources for a particular item/part/product are associated with an identifier for a particular item/part/product and separately transmitted to the 3D configurator application 108. In these embodiments (and others), the art resources are manipulated (visually) via interaction by the user with the UI elements defined within the UI model 206 and coordination between the UI model 206, unified model 204 and mesh controller 208. In particular embodiments, the UI model 206 modifies data in the unified model 204, which will then trigger the mesh controller 208 to update.

In one embodiment, the remote models and services 110 may include a configurable item service 214 ("CIS"), where the CIS 214 is a service for receiving user credentials from the deployable application 202, and in return transmitting to the deployable application 202 one or more graph files that correspond to the user credentials. For example, the CIS 214 may determine that a user's login credentials may be associated with a particular unified model 204, and thus the CIS 214 controls which objects or items are available to that user for building within the 3D configurator 108. In one embodiment, the 3D configurator 108 may authenticate the user's credentials (e.g., at the CIS 214). The 3D configurator 108, in this example, may fetch the mesh controller 208, UI model 206, unified model 204, and art assets for parts/products to which the user has access and downloads these to the 3D configurator 108. As will be understood from discussions herein, each item/part/product is given a unique identifier (ID) and the mesh controller 208, UI model 206, and unified model 204 are each identified by a corresponding unique ID.

Continuing with FIG. 2, a CAD plug-in 216 is also operatively connected to the remote models and services 110, according to various aspects of the present disclosure. In one embodiment, the CAD plug-in 216 is a software tool configured to operate in conjunction with a CAD software application or platform of the CAD system 114 (not shown), and the CAD plug-in 216 may include an operative connection to the CIS 214 for accessing models and other data stored within the remote models and services 110. In particular embodiments, the CAD plug-in 216 may be operatively connected to any component of the remote models and services 110, and may not require communication with the CIS 214 for receiving data (e.g., configuration data). In various embodiments, the CAD plug-in 216 may include an operative connection to other models or applications, such as an application for quoting/pricing a 3D configurator assembly based on the configuration data defining the assembly, and the CAD plug-in 216 may request or receive configuration data from such resources.

For example, in one embodiment, the CAD plug-in 216 may access saved configurations 218 from the remote models and services 110. Continuing with this example, the CAD plug-in 216 may convert accessed saved configurations 218 into the CAD connector format 118, where the CAD connector format 118 is platform agnostic and may be used by the CAD plug-in 216 for generating part instances representative of the individual parts from the saved configurations 218 (e.g., in CAD format).

In various embodiments, the CAD plug-in 216 may include a flexible mapping service, where the flexible mapping service is operable to convert (or map) the data from the saved configurations 218 to the CAD connector format 118 (not shown). In certain embodiments, the remote models and services 110 may also include master part models 220 for determining how objects within the saved 3D configuration 218 are to be represented and assembled in the CAD system 214 (not shown), via the CAD plug-in 216. In some embodiments, the master part models 220 may also be stored local to the CAD plug-in 216.

Figure 3:
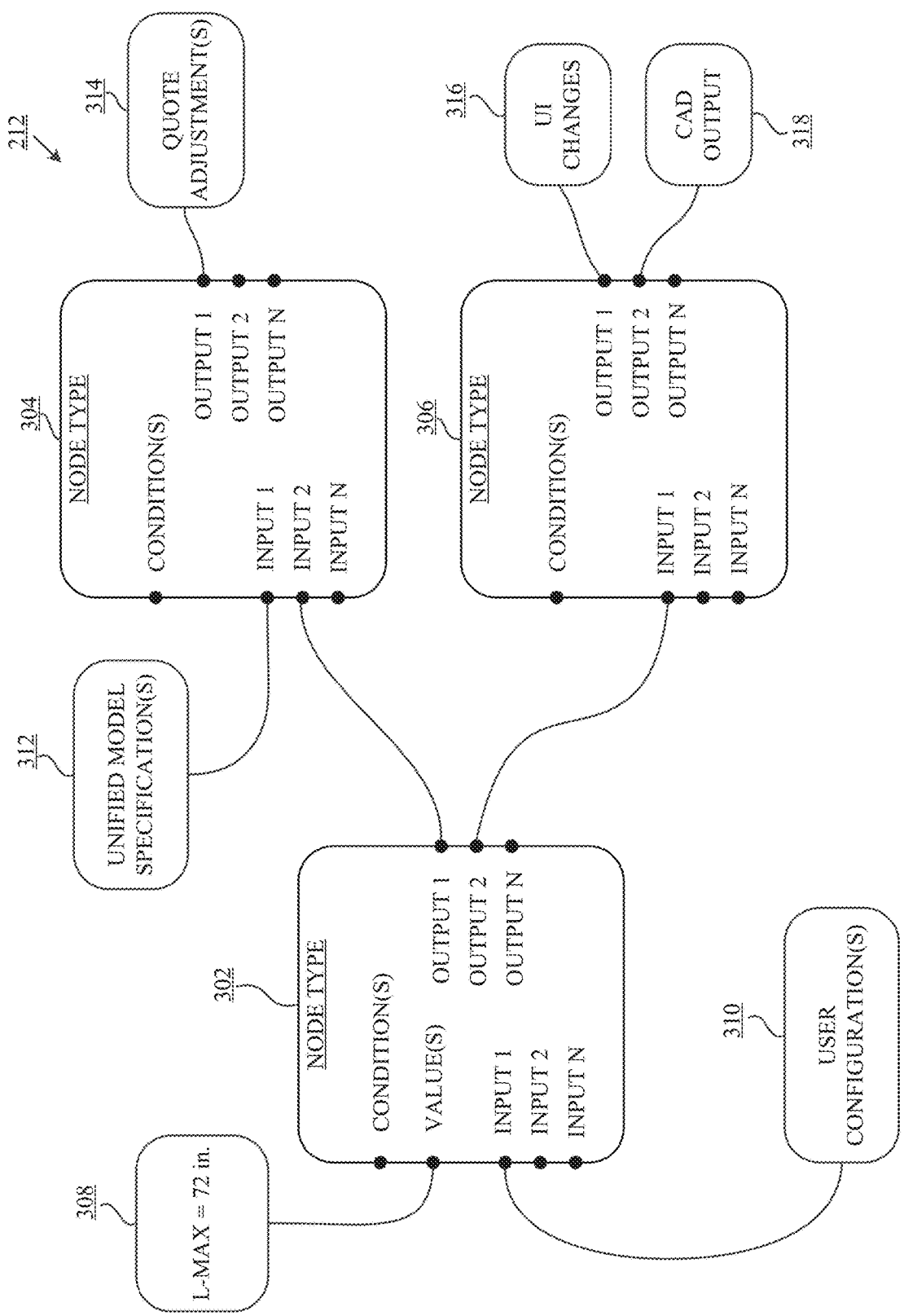
FIG. 3 is an exemplary graph file editor, according to one aspect of the present disclosure.

In a particular embodiment, FIG. 3 is a diagram illustrating exemplary functionality of a graph editor 212. As mentioned above in the discussion of FIG. 2, the remote models and services 110 may include a graph/model editor 212 for creating and/or modifying the one or more models included therein. As shown in the present embodiment, the exemplary graph editor 212 provides a visual programming tool for determining object/item behavior, configuring pricing, determining changes to the UI, and generally creating relationships between various system components and assets. According to various aspects of the present disclosure, the exemplary graph editor 212 allows for administrators (or users) of the system to visually program behavior of the 3D configurator via connecting a plurality of nodes where each node represents a portion of logic (defined by backend code). In the present embodiment, three nodes are represented; however, it should be understood that any appropriate number of nodes may be instantiated for defining particular product behaviors.

As shown in the present embodiment, the exemplary graph editor 212 includes three nodes, 302, 304, and 306, where each node may be of a particular type. In various embodiments, node types are determined by the logic they represent. For example, some nodes may represent a logical "else" statement, where other nodes may represent more complex "if-then" statements (e.g., IFTTT). In particular embodiments, each node in the exemplary graph editor 212 may include one or more inputs, or input anchors, for accepting data from other nodes, other system components, etc. According to various aspects of the present disclosure, each node may also be configured with predetermined "conditions" and/or "values," which may be evaluated against the one or more inputs. In various embodiments, the "condition(s)" element may allow for a user to select (from predefined conditions) or manually define certain logical tests to operate on the node inputs. In response to evaluating the one or more inputs and/or conditions and values, the one or more nodes may generate one or more outputs, which may serve as inputs to additional nodes, or may provide direct changes or adjustments to the system.

According to various aspects of the present disclosure, the node 302 is associated with a constant value 308, "L-MAX=72 in.," where L-MAX is a maximum length allowed for a particular pipe in a particular industrial piping configuration (for example purposes only). In certain embodiments, the L-MAX value may be hard-coded or otherwise predetermined for being compared to or evaluated against particular node inputs, such as the user configuration(s) input 310. In one embodiment, the user configuration(s) 310 may include a request for extending or rotating various items on the 3D configurator 108, or other similar signals. According to the present embodiment, the logic of the node 302 may evaluate the user configuration 310 against the constant value 308 to determine if the user configuration 310 input is valid and acceptable, according to the predefined constraints (e.g., L-MAX=72 in.). According to various aspects of the present disclosure, if the user configuration 310 complies with the constant value 308, the node 302 may generate one or more outputs to be accepted by one or more additional nodes.

Continuing with FIG. 3, the one or more outputs from the node 302 may be accepted as inputs into both nodes 304 and 306. In the present embodiment, the node 304 also accepts unified model specification(s) 312 as an input. As discussed above in association with FIG. 2, the unified model may define particular configurable items (e.g., pipes) according to their characteristics, limitations, availability, costs, etc. As such, the node 304 may have access to the unified model data for the items that correspond to the user configuration(s) 310. According to various aspects of the present disclosure, the node 304 may compare these unified model specifications 312, such as a price per inch, to the node 302 output (e.g., a particular pipe configuration) and furthermore output a generated quote adjustment 314. In various embodiments, the quote adjustment 314 may be a price that reflects the user configuration(s) 310 and allows for the user to design his/her desired piping configuration "on the fly" while receiving real-time quote adjustments 314 that reflect the current configuration.

In one embodiment, the node 306 may also receive, as an input, the output from the node 302. According to various aspects of the present disclosure, the node 306 may receive various node inputs, such as inputs from software engines (e.g., a rules engine) or other system components that include remote logic. In certain embodiments, these engines may include remote logic or rules for predefined outcomes based on particular inputs (e.g., pipe sizes). For example, if the user configuration(s) 310 includes data for elongating a pipe to 70 inches, a rules engine may include logic that determines a series of workflow actions, such as manipulating the user interface (UI changes 316) to show the elongated pipe as well as showing modified accompanying pipes to accommodate the user configuration(s) 310. In some embodiments, the node 306 may output a request for transforming the current status of the 3D configurator 108 to a CAD service 318. In various embodiments, the CAD service 318 may transform the 3D configurator 108 data into a workable CAD format that may be used for generating files required to manufacture the configured parts/items (as will be described in greater detail below in association with FIGS. 11-20).

Figure 4:
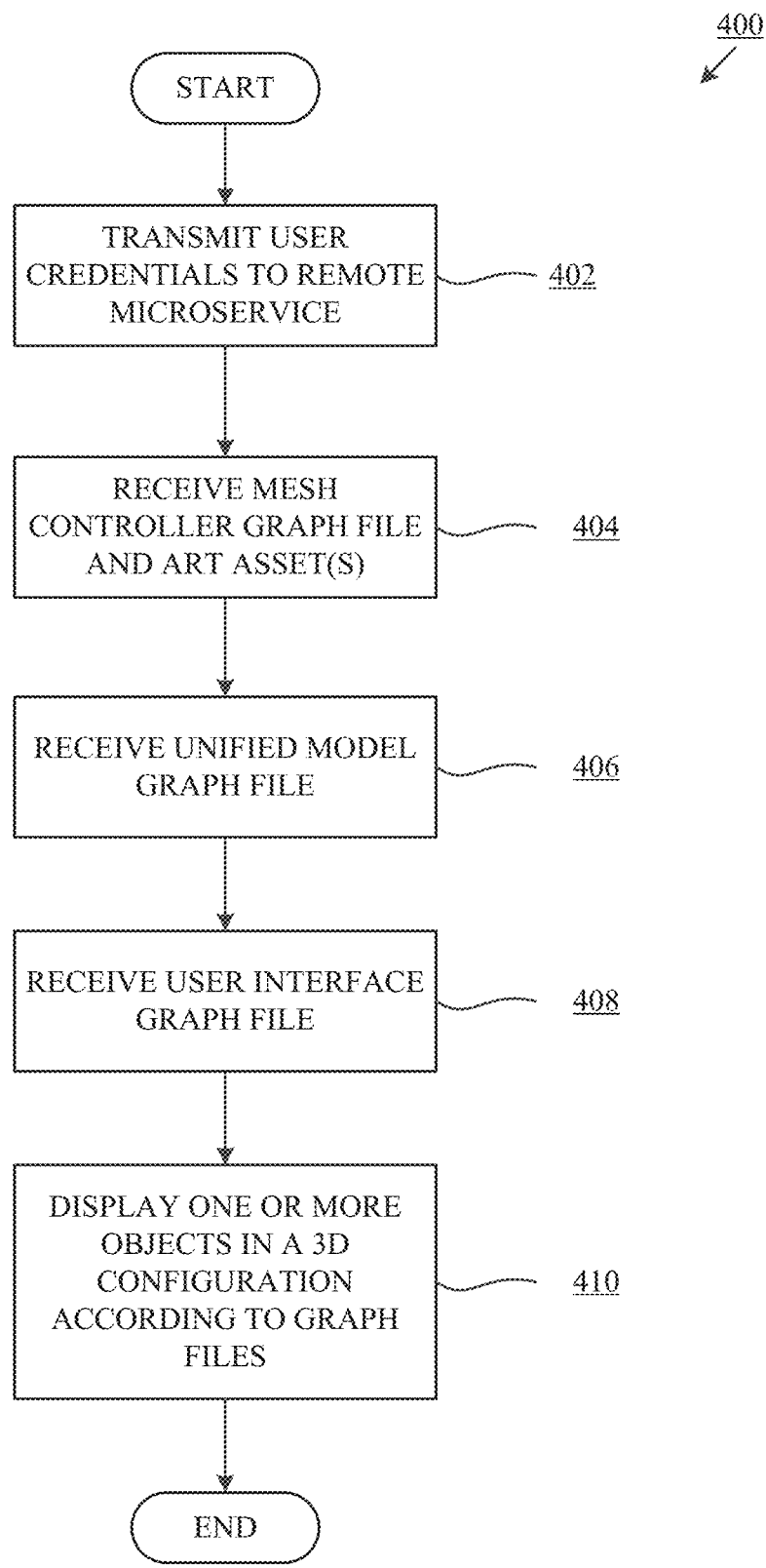
FIG. 4 is an exemplary flowchart, according to one aspect of the present disclosure.

Turning now to FIG. 4, a flowchart is shown illustrating an exemplary system setup process 400, according to one aspect of the present disclosure. In one embodiment, the process 400 begins at step 402, where the computing device transmits user credentials to a remote microservice. According to various aspects of the present disclosure, the remote microservice may be the configurable item service (CIS) 214 discussed above in association with FIG. 2. In various embodiments, the CIS 214 determines which graph files and models a user may have access to, and what aspects within those graph files and models the user may use within the 3D configurator 108. In particular embodiments, the CIS 214 may receive some or all of the graph files and furthermore store the graph files for efficient access by the computing device 104, to be used by the 3D configurator 108.

At step 404, and in response to transmitting the user credentials to the CIS 214 at step 402, the computing device 104 may receive a mesh controller graph file and corresponding art asset(s) from the CIS 214. As mentioned above in the discussion of FIG. 2, the mesh controller graph file is a data object created with associated 3D art assets for defining how a particular item's properties are represented in a 3D configuration (e.g., how a pipe appears when the length is extended).

In one embodiment, at step 406, the computing device 104 may receive a unified model graph file. In various embodiments, the unified model graph file may define the various properties and behaviors associated with the items available to the user, based on his/her credentials. For example, the unified model graph file may define item properties such as a pipe having an available length between 4 inches and 4 feet, and also a diameter between 2 inches and 4 includes.

In a particular embodiment, at step 408, the system may receive a user interface graph file. In various embodiments, the user interface graph file determines how the items included in the unified model graph file are presented to the user. For example, the unified model graph file may define a pipe available at various lengths and various materials, and the user interface graph file may determine how the various lengths and materials are presented to the user. Continuing with this example, the user interface graph file may determine that the various lengths be presented via a slide-bar, and that the various materials be presented via a visual "swatch," or the like.

According to various aspects of the present disclosure, at step 410, the system may display the one or more objects in a 3D configuration according to the received graph files. According to various aspects of the present disclosure, in response to receiving the graph files (from steps 404, 406, and 408), the 3D configurator at the computing device 104 may visually display the graph file contents. For example, the user may have a pre-saved configuration that was loaded via the mesh controller, which includes various items defined within the unified model graph file, and is displayed according to the user interface model graph file.

Figure 5:
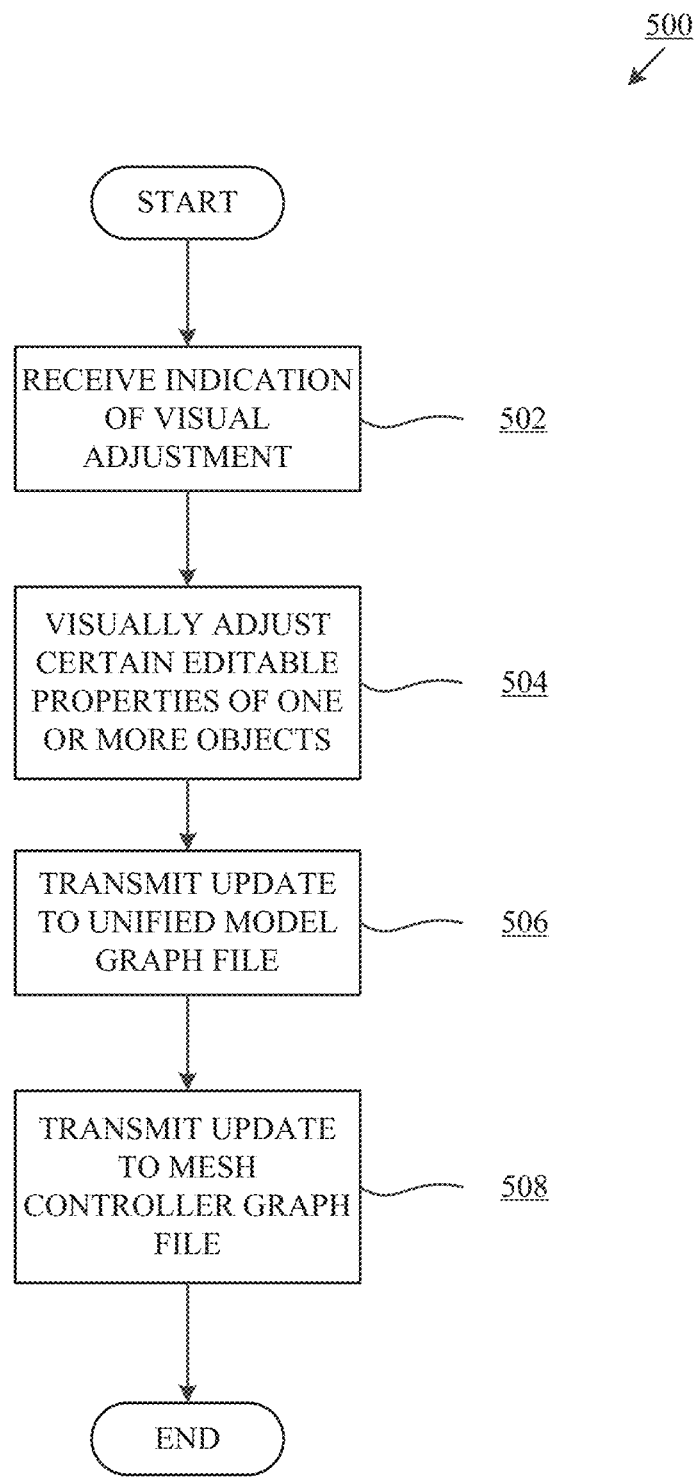
FIG. 5 is an exemplary flowchart, according to one aspect of the present disclosure.

Referring now to FIG. 5, a flowchart is shown illustrating an exemplary system update process 500. In one embodiment, at step 502 the system receives a request for visual adjustment of one or more items in the 3D configurator 108. According to various aspects of the present disclosure, the requests received at step 502 may be initiated in response to a user extending, rotating, rearranging, etc., a particular item within the 3D configurator 108, or in response to the user adding or removing a particular item within the 3D configurator 108. In some embodiments, the 3D configurator 108 may be operated in an augmented reality or virtual reality environment ("AR/VR"), and changes within those environments may also initiate the request received at the step 502.

At step 504, according to one embodiment, the 3D configurator 108 may visually adjust the certain editable properties of the one or more adjusted items from step 502. In certain embodiments, the 3D configurator 108 may also visually adjust related items, such as adjusting a pipe cap if the diameter of the pipe was modified.

In one embodiment, at step 506, the adjustments and updates from step 504, as received at step 502, are transmitted to (or saved as) the unified model graph file. In particular embodiments, the unified model graph file may store a version of the current configuration displayed in the 3D configurator 108. Accordingly, and in various embodiments, changes or updates to items shown in the 3D configurator 108 may initiate the update to the unified model graph file.

At step 508, the adjustments and updates are further transmitted to the mesh controller graph file. According to various aspects of the present disclosure, the mesh controller graph file may coordinate the length of the particular part with the art assets to then visually change the way the particular 3D art appear on the user 3D configurator 108.

Figure 6:
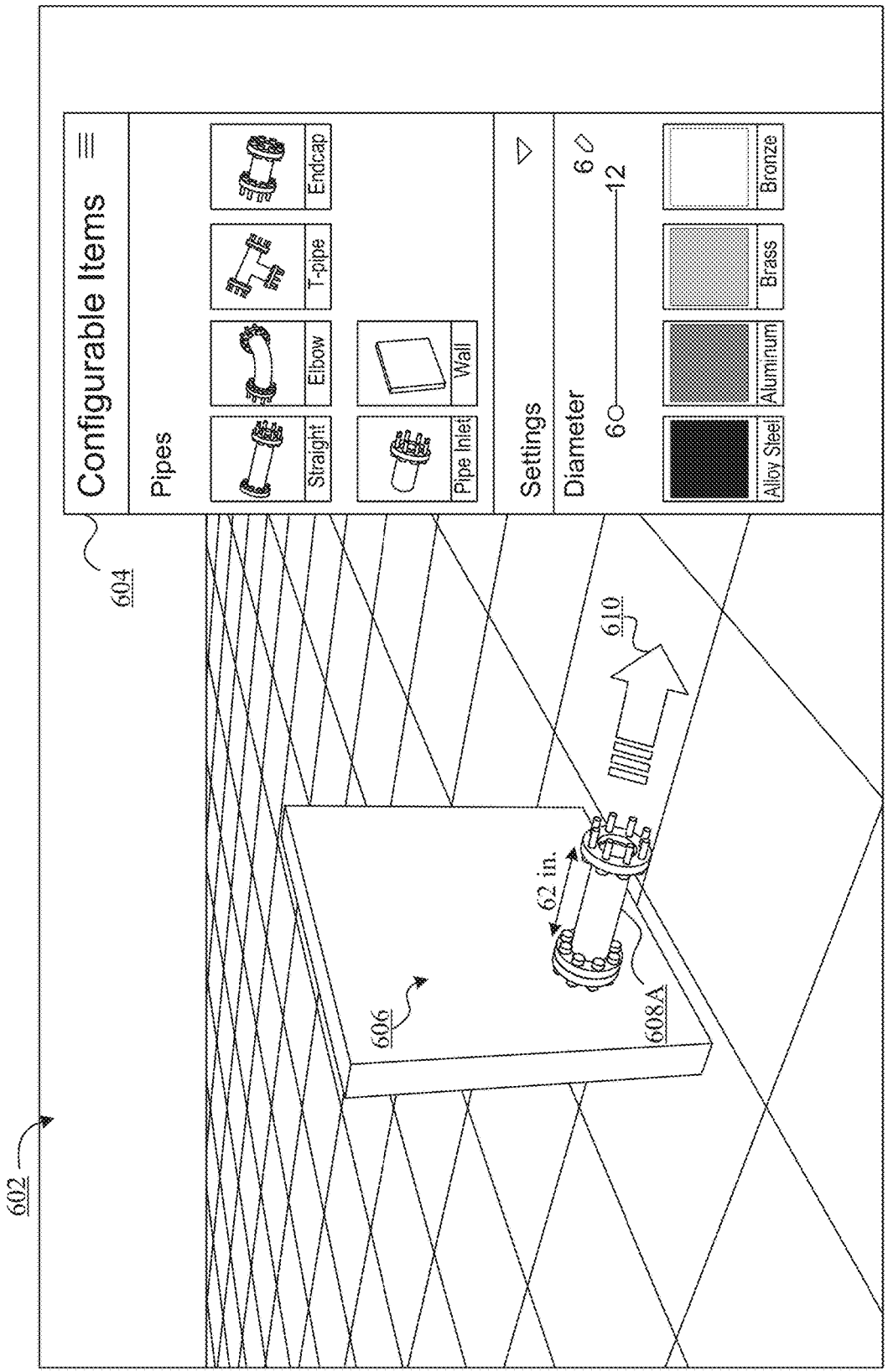
FIG. 6 is an exemplary view of a 3D configurator application, according to one aspect of the present disclosure.

Reference will now be made to FIGS. 6-10, which illustrate, according to various embodiments, the 3D configurator application and its exemplary functionality. Referring first to FIG. 6, the 3D configurator application is shown including a 3D environment 602 with a user interface (UI) 604, and a current build configuration 606. As mentioned throughout the present disclosure, a unified model may define items/objects available to particular users (based on their credentials) for visually building 3D configurations from those items/objects. In one embodiment, the user interface 604 may be supported by the UI model, where the UI model may define how the available items/parts are displayed to the user of the 3D configurator application.

Continuing with FIG. 6, a pipe 608A is shown in the current build configuration 606 as having a length of 62 inches. In various embodiments, the 3D configurator application may include visual indicators or icons representing the ability to modify or adjust certain items within the 3D configurator application. For example, as shown in the present embodiment, an extension arrow 610 is located near the pipe 608A indicating that the pipe is extendable. As will be understood, other available functionality may be indicated by other icons within the 3D configurator.

Figure 7:
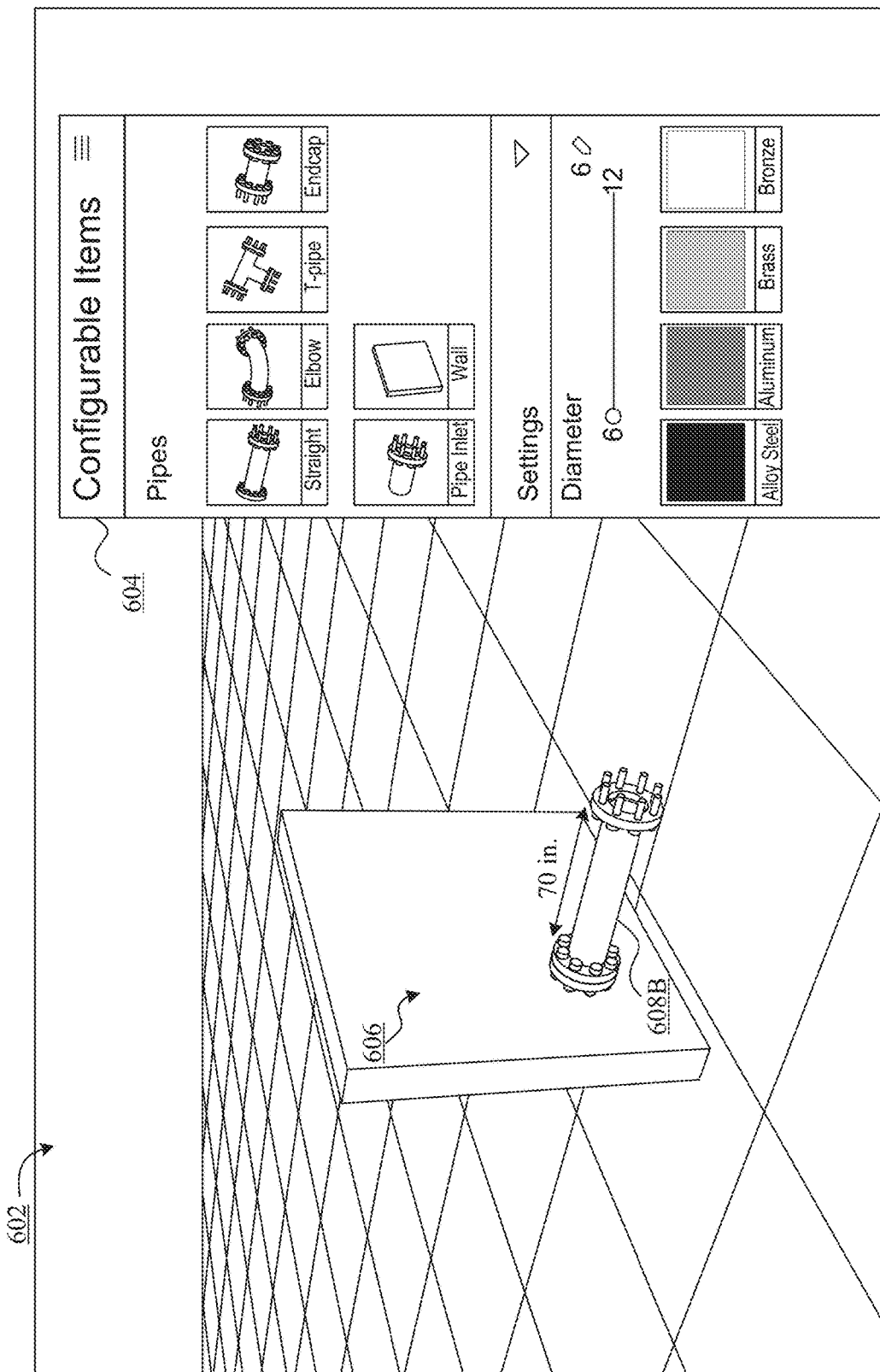
FIG. 7 is an exemplary view of a 3D configurator application, according to one aspect of the present disclosure.

Turning now to FIG. 7, a pipe 608B is shown in the build configuration 606 including a length of 70 inches. According to various aspects of the present disclosure, the pipe 608B may be an extended version of the pipe 608A, where the pipe 608B is extended as a result of a user of the 3D configurator to extend the pipe. In certain embodiments, the user may select to extend the pipe 608B by clicking and dragging an end of the pipe, moving a curser along a slide bar, manually entering the desired length, selecting from a predetermined set of available lengths, etc.

Figure 8:
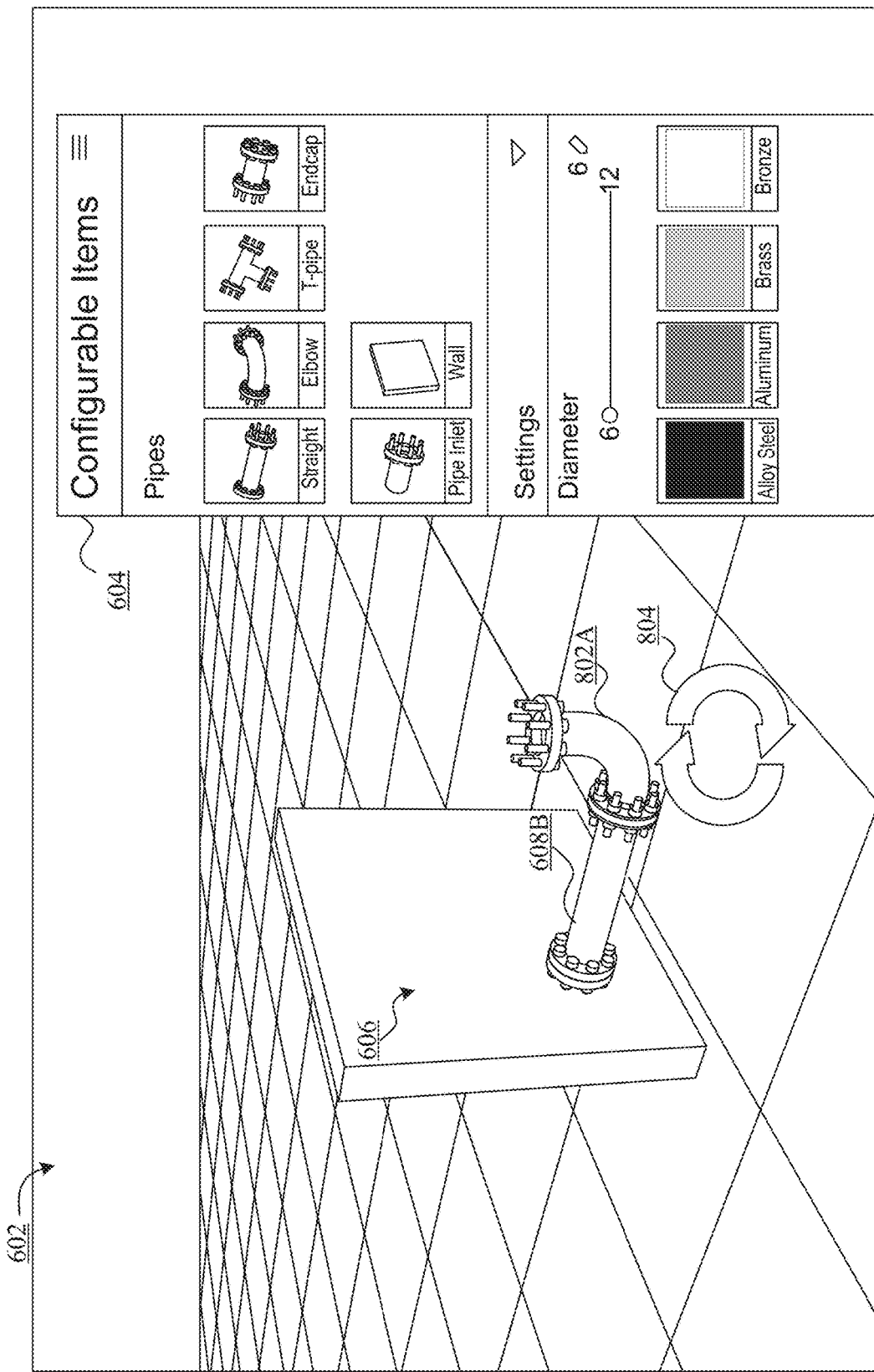
FIG. 8 is an exemplary view of a 3D configurator application, according to one aspect of the present disclosure.
Figure 9:
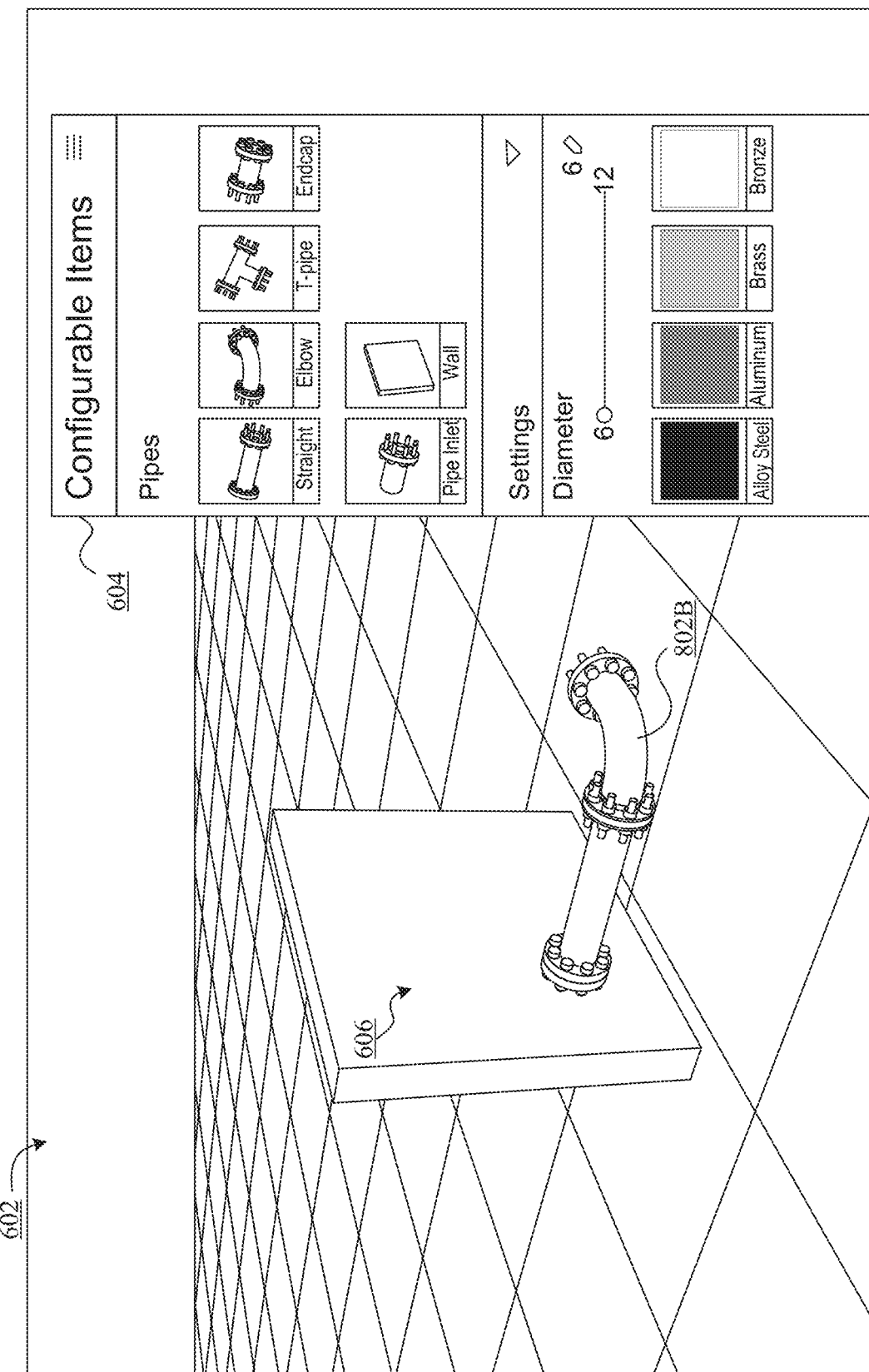
FIG. 9 is an exemplary view of a 3D configurator application, according to one aspect of the present disclosure.

According to various embodiments, and as shown in FIG. 8, a user of the 3D configurator application may add additional items to the build configuration 606. In one embodiment, FIG. 8 includes a pipe elbow 802A connected to the pipe 608B. Similar to the extension arrow 610 shown in FIG. 6, a pair of rotational arrows 804 are shown in the present embodiment for indicating that the pipe elbow 802A may be rotated in various configurations or orientations. In some embodiments, a default configuration of the pipe elbow 802A is pointed in an upwards orientation. In various embodiments, a user of the 3D configurator may toggle the available options for rotating the pipe 802A before selecting a final orientation, which is shown as 802B in the embodiment illustrated in FIG. 9.

Figure 10:
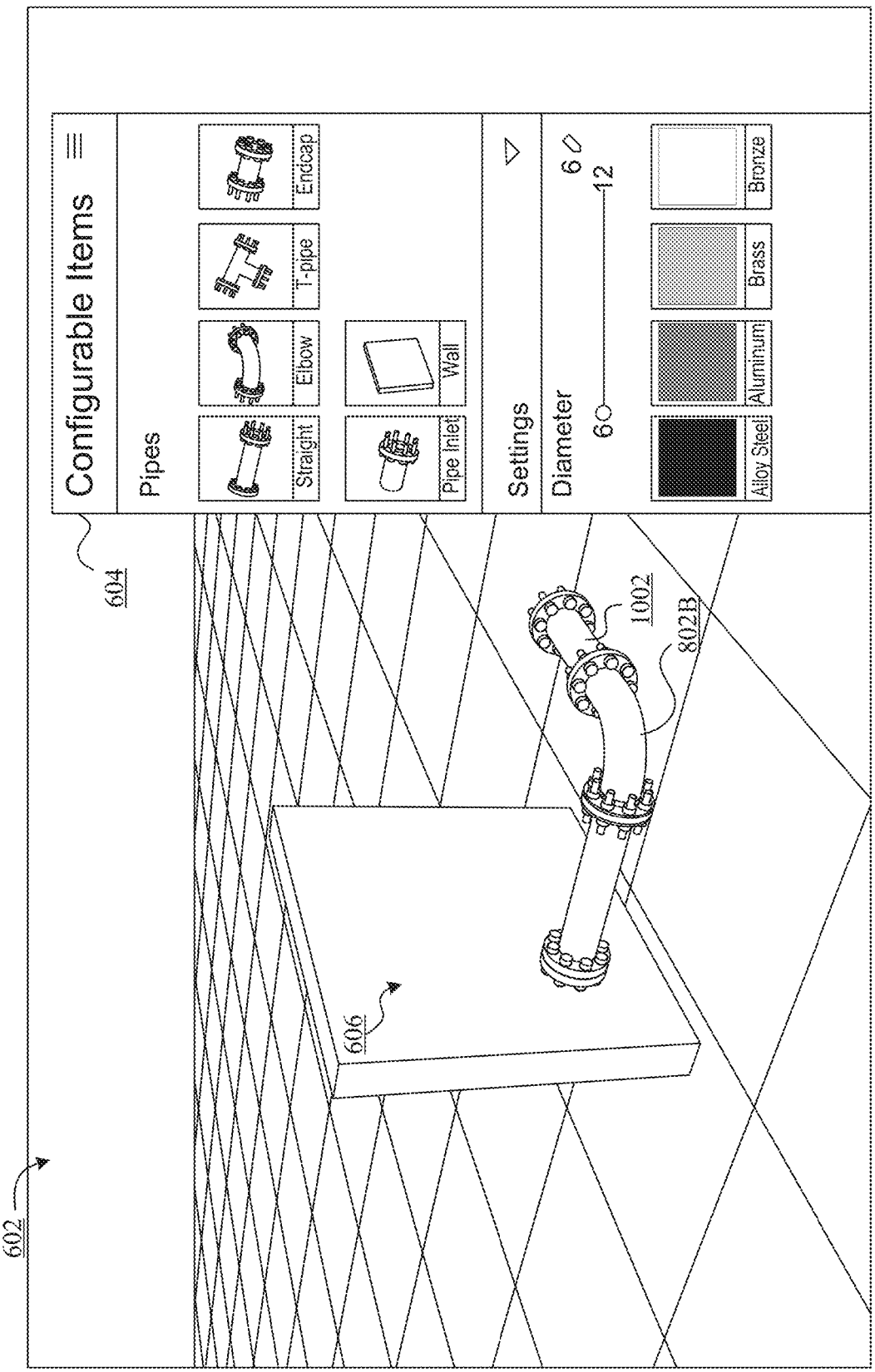
FIG. 10 is an exemplary view of a 3D configurator application, according to one aspect of the present disclosure.

In various embodiments, FIG. 10 illustrates the ability for a user of the 3D configurator to continue to add to and modify the items within the build configuration. As shown in the present embodiment, an additional pipe 1002 is added to the pipe elbow 802B. In particular embodiments, and as described in association with the pipe 608A, the additional pipe 1002 may be extended (or shortened) to meet the requirements of the user operating the 3D configurator application.

Figure 11:
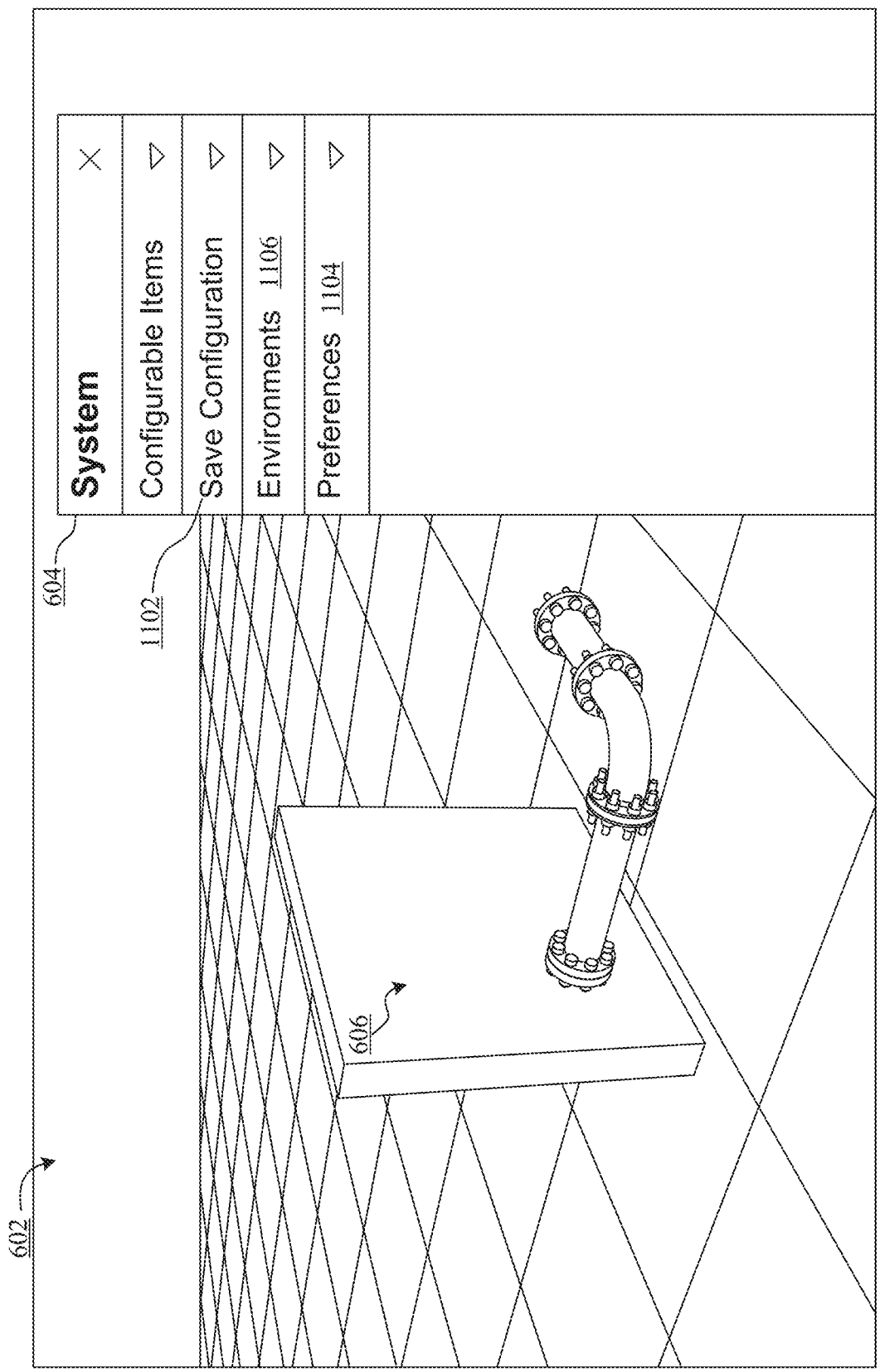
FIG. 11 is an exemplary view of a 3D configurator application, according to one aspect of the present disclosure.

Turning now to FIG. 11, an additional view of the user interface 604 toolbar within the 3D configurator 108 is shown, according to one aspect of the present disclosure. As discussed throughout the present disclosure, a user may select to save a particular 3D configuration (such as the configuration 606 in the present embodiment) for reasons such as revising the configuration at a later time, exporting the configuration to another service (such as a CAD software application), cataloging the configuration for a customer, etc. As shown in the present embodiment, the user interface 604 is shown including a "Save Configuration" tab 1102, which the user may select (via touching on a touchscreen, clicking via a mouse, performing a hand gesture, vocalizing a command, etc.) for being presented with options for saving the configuration. In particular embodiments, the user interface 604 may also include additional options for interacting with or controlling the 3D environment 602, such as tabs for configuring preferences (Preference 1104) or changing the environment settings (Environments 1106).

Figure 12:
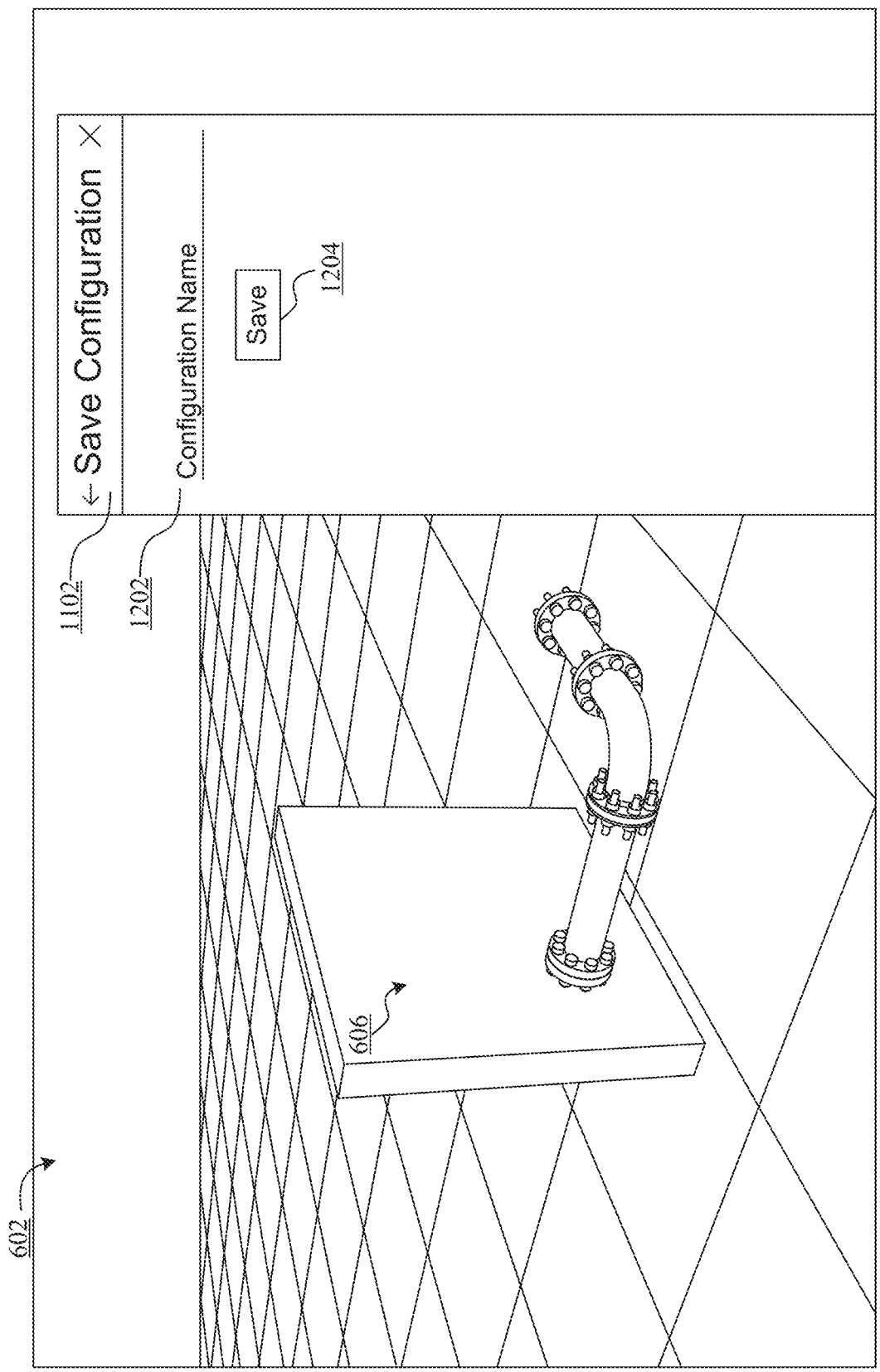
FIG. 12 is an exemplary view of a 3D configurator application, according to one aspect of the present disclosure.

FIG. 12 illustrates the save configuration tab 1102 of the user interface 604, according to one aspect of the present disclosure. According to various aspects of the present disclosure, the save configuration tab 1102 may allow for the user to enter a name for the 3D configuration (Configuration Name 1202), and in some embodiments the user may include other information such as a description of the configuration for further identifying the configuration. In response to the user selecting the "Save" button 1204 shown in the present embodiment, the 3D configurator 108 (or the computing device 104) may transmit the configuration data to the remote models and services 110 for storing the configuration data in an index or searchable database (shown in FIG. 1). In certain embodiments, storing the 3D configuration data at the remote models and services 110 may allow for the data to be accessed by other services, such as a CAD software application or associated plug-in (to be discussed below).

Figure 13:
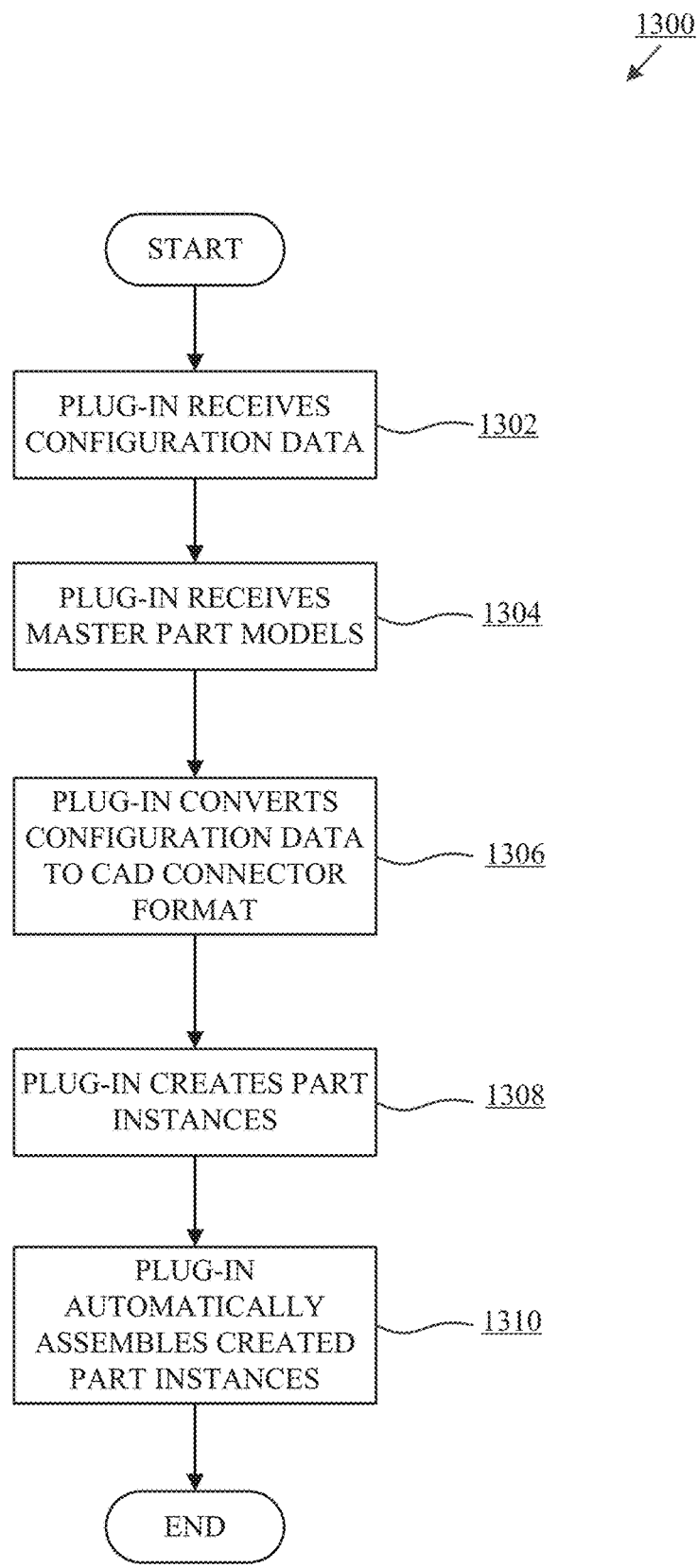
FIG. 13 is a flowchart of an exemplary configuration import process, according to one aspect of the present disclosure.

FIG. 13 depicts a flowchart of an exemplary configuration import process 1300, according to one aspect of the present disclosure. In various embodiments, the configuration import process 1300 includes steps, executed by a CAD plug-in or similar software tool in a CAD system, where the steps allow for saved 3D configurations developed on-the-fly on a user's computing device to be transformed into a format acceptable for use in a CAD software application. In a particular embodiment, the configuration import process 1300 begins at step 1302, where the CAD plug-in receives configuration data. As mentioned above in association with FIG. 2, the user 102 may select to export and store 3D configurations at the remote models and services 110, in various embodiments. According to various aspects of the present disclosure, at step 1302, the plug-in may receive the stored configuration from the remote models and service 110 either via a request/query for the stored configurations, or the stored configurations may be automatically transmitted to the CAD plug-in.

In various embodiments, and at step 1304, the CAD plug-in may also receive one or more master part models. Also discussed briefly in association with FIG. 2, the remote models and services 110 may store the one or more master part models, which provide templates for determining how particular parts should be generated and represented within a CAD environment based on certain parameters included in the saved 3D configuration data. Accordingly, the CAD plug-in may receive the master part models from the remote models and services 110, or the master part models may be stored locally to the CAD plug-in.

Continuing with the configuration import process 1300, at step 1306, the CAD plug-in converts the configuration data received at step 1302 into a CAD connector format, in certain embodiments. According to various aspects of the present disclosure, the CAD connector format is a platform agnostic data format (such as JSON) where the CAD connector format may be compatible with any CAD software application. In one embodiment, converting the 3D configuration data into the CAD connector format allows unnecessary data to be stripped from the 3D configuration data (such as data relating to stylistic details), such that the CAD connector format may include only the minimum amount of information required to fully recreate the 3D configuration parts in a CAD environment. For example, aspects of the CAD connector format may include the configuration name, an array of parts in the assembly, available axes of rotation for the parts, available connection points for the parts, etc. In particular embodiments, the CAD connector format may be transformed into a CAD specific format (e.g., a format native to SolidWorks or the like) for building/recreating the 3D configuration parts.

Proceeding now to step 1308, in one embodiment, the CAD plug-in generates the part instances corresponding to the configuration data received at step 1302. In various embodiments, generating the part instances at step 1308 includes leveraging reference geometries of the master parts models, where the reference geometries define how particular parts are to be generated based on the parameters of the 3D configuration data. For example, reference geometries may include surface planes and normal planes for defining how a particular part may align with other parts. Continuing with the above example, the reference geometries may also include one or more connector points that define how the part instances may connect to each other, one or more angle mates for defining the angles at which parts instances are to be connected, the general shapes and dimensions of the part instances, etc.

In various embodiments, at step 1310, the CAD plug-in may automatically assemble the generated part instances. According to various aspects of the present disclosure, automatically assembling the generated part instances may include connecting and aligning the part instances such that the part instances are assembled to resemble the imported 3D configuration.

Figure 14:
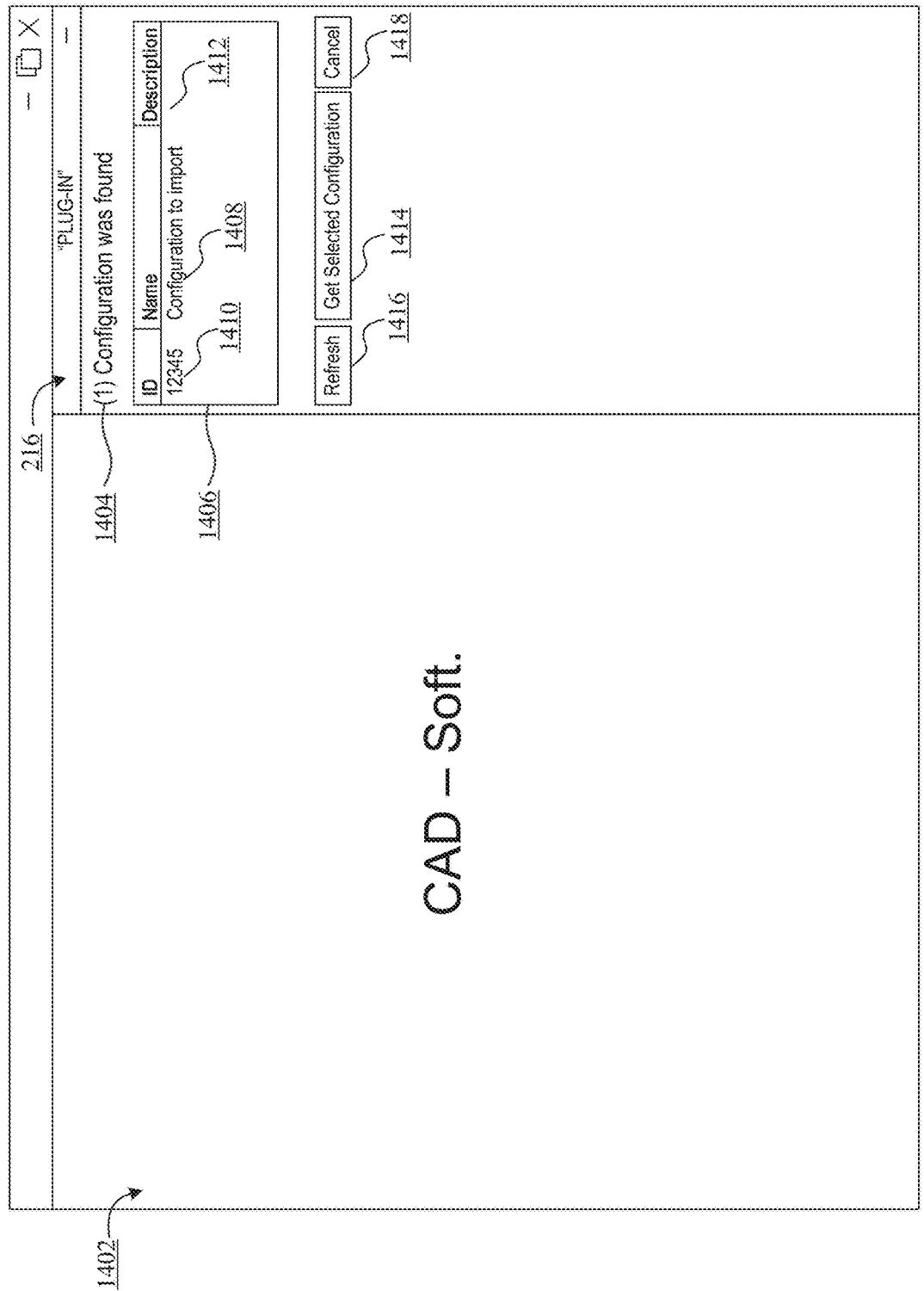
FIG. 14 is an exemplary view of a CAD software application, according to one aspect of the present disclosure.

Turning now to FIG. 14, an exemplary CAD software application is shown, according to one aspect of the present disclosure. As will be understood by the discussion herein, any appropriate CAD software may be used for importing saved 3D configurations, namely software such as Solid-Works, AutoCAD, or the like. In various embodiments, a CAD user may log into the CAD software application (or a plug-in at the CAD software application) just as he/she would log into the 3D configurator 108, where a username, password, identification number, company identifier, etc., may be used for authenticating the user and also determining which resources the user may have access to within the remote models and services 110. In certain embodiments, the CAD user may be the user 102, or the CAD user may be a separate user, such as a customer of the user 102 or a manufacturer hired to build the saved 3D configuration(s).

As shown in the present embodiment, and in response to the CAD user logging into or initiating the CAD software application, an exemplary CAD environment 1402 is displayed. In particular embodiments, the CAD plug-in 216 may also be displayed, where the CAD plug-in 216 is included as a tab, or the like, within the CAD environment 1402. According to various aspects of the present disclosure, the CAD plug-in 216 may receive saved 3D configurations 218 from the remote models and services 110 and furthermore display the saved 3D configurations 218 as available configurations to be imported into the CAD environment 1402.

As shown in the present embodiment, the plug-in 216 includes a configuration summary 1404 and configuration index 1406. In one embodiment, the configuration summary 1404 includes an indication of the total number of configurations received from, or that are available to be imported from the remote models and services 110. In the present embodiment, the configuration summary 1304 indicates that one (1) configuration was found (and can be imported via the plug-in 216).

Continuing with FIG. 14, the configuration index 1406 may include a table of the available and importable configurations, according to various aspects of the present disclosure. In one embodiment, the configuration index 1406 may include aspects such as a configuration name 1408, a configuration ID 1410, a configuration description 1412, etc. In particular embodiments, the configuration name 1408 and description 1412 may be generated via the user when saving configurations via the save configuration tab 1102 (as shown in FIG. 11), and the configuration ID 1410 may be generated in response to being received by the CAD plug-in 216.

In various embodiments, available configurations within the configuration index 1406 may be selected and furthermore confirmed via a "Get Selected Configuration" button 1414 (or simply "Get Configuration" 1414). In certain embodiments, confirming a selected configuration via the Get Configuration 1414 button may initiate the import process, where the part data from the configuration file is translated, via the plug-in 216, into an appropriate CAD format (e.g., the CAD connector format 118). In some embodiments, the plug-in 216 may also include buttons or options to refresh (e.g., the Refresh button 1416) the configuration summary 1404 and corresponding configuration index 1406, or cancel (e.g., the Cancel button 1418) an imported/importing configuration file.

Figure 15:
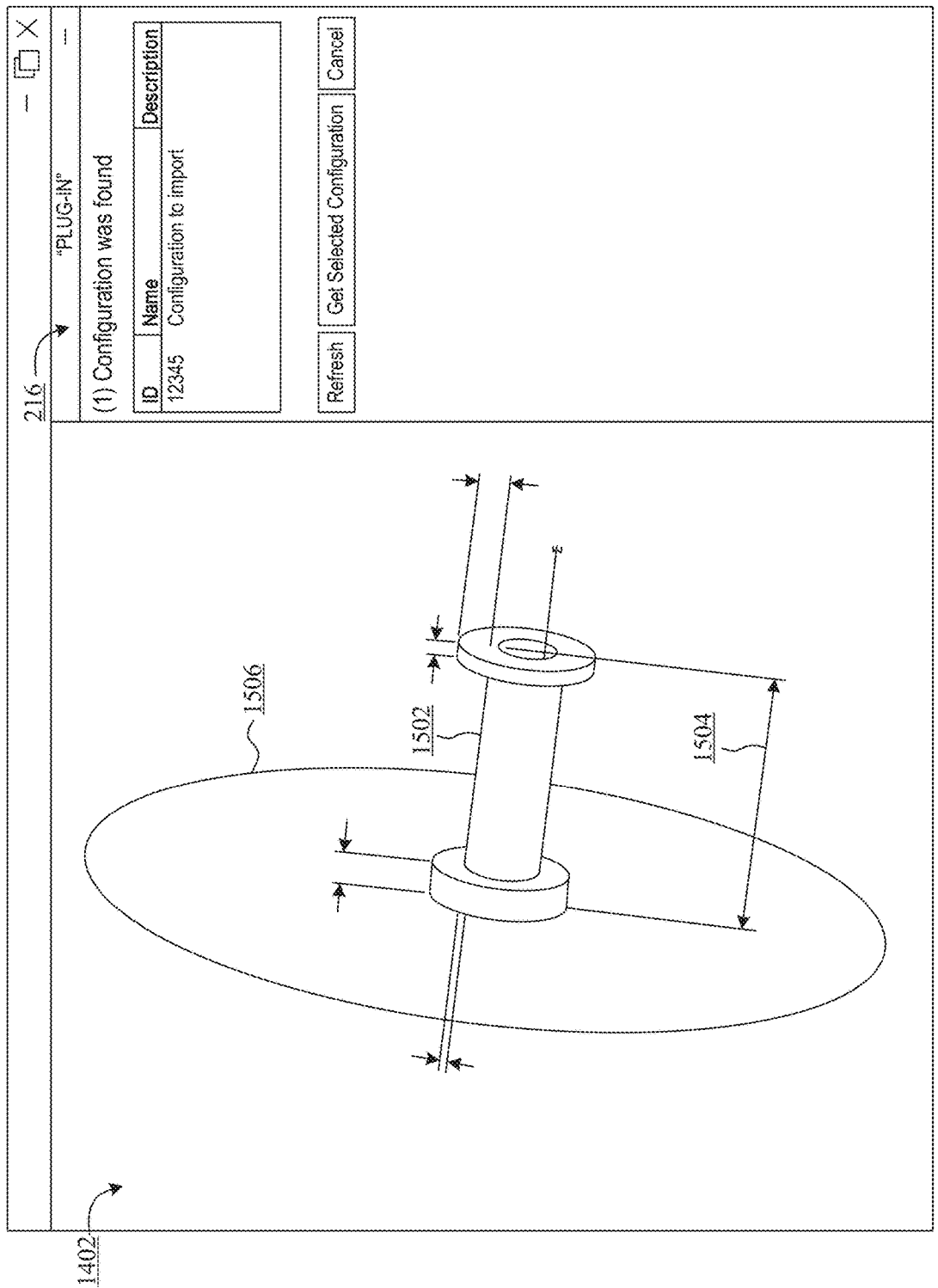
FIG. 15 is an exemplary view of a CAD software application, according to one aspect of the present disclosure.

According to a particular embodiment, FIG. 15 illustrates automatically building a particular part instance within the CAD environment 1402. In one embodiment, the plug-in 216 facilitates the building of one or more part instances that resemble or mirror each individual part of the assembly from the selected and imported 3D configuration. As shown in the present embodiment, a part instance 1502 is automatically built in the CAD environment 1402 via the plug-in 216 and according to the corresponding reference geometry. In certain embodiments, the master part models stored at the CAD plug-in 216 (or at the remote models and services 110) may include the reference geometries for determining how each part should be represented and configured within the CAD environment based on the dimensions of each part, as included in the saved configuration data 218. As shown in the present embodiment, the part instance 1502 is built in the CAD environment 1402 according to one or more dimensions, such as the dimension 1504, and also one or more planes, such as the plane 1506. It should be understood from the discussion herein that a particular part may include a plurality of dimensions corresponding to various aspects of the particular part, and these dimensions may each be a build parameter consumed via the master part models when building/instantiating part instances. According to various aspects of the present disclosure, the plug-in 216 may build each part of the configuration file in this way (either sequentially or in parallel), and then automatically assemble the parts to resemble or mirror the original 3D configuration.

Consider, for example, a scenario where an assembly of piping parts (or any other appropriate object or arrangement of objects) is designed via the 3D configurator and furthermore saved for being consumed by a CAD system. In this example, each part or object in the assembly may include one or more dimensions for generally defining the length, height, width, or other aspects of the object. According to various aspects of the present disclosure, these one or more dimensions, as well as other information such as rotation/orientation relative to a reference point or other objects, may be included in the configuration data saved by the 3D configurator. In various embodiments, when the configuration data is converted into a CAD connector format, data corresponding to these one or more dimensions and orientations is included, thereby allowing the individual objects of the assembly to be re-created according to the originally designed sizes, proportions, and general configurations.

In certain embodiments, the master part models may include the one or more dimensions and/or orientations, as discussed in the example immediately above, for instantiating and building each object of the assembly. As depicted in FIG. 15, various aspects of the part instance 1502 include specific dimensions, or dimension relationships, where the system may interpret each dimension of the part instance as a corresponding master part model dimension in the CAD connector format. In one embodiment, the master part models are parametrically driven data objects, and particular instances (e.g., part instances) of the master part models can be generated/instantiated based on a particular set of parameters, such as one or more object dimensions and/or the orientations of the objects.

Figure 16:
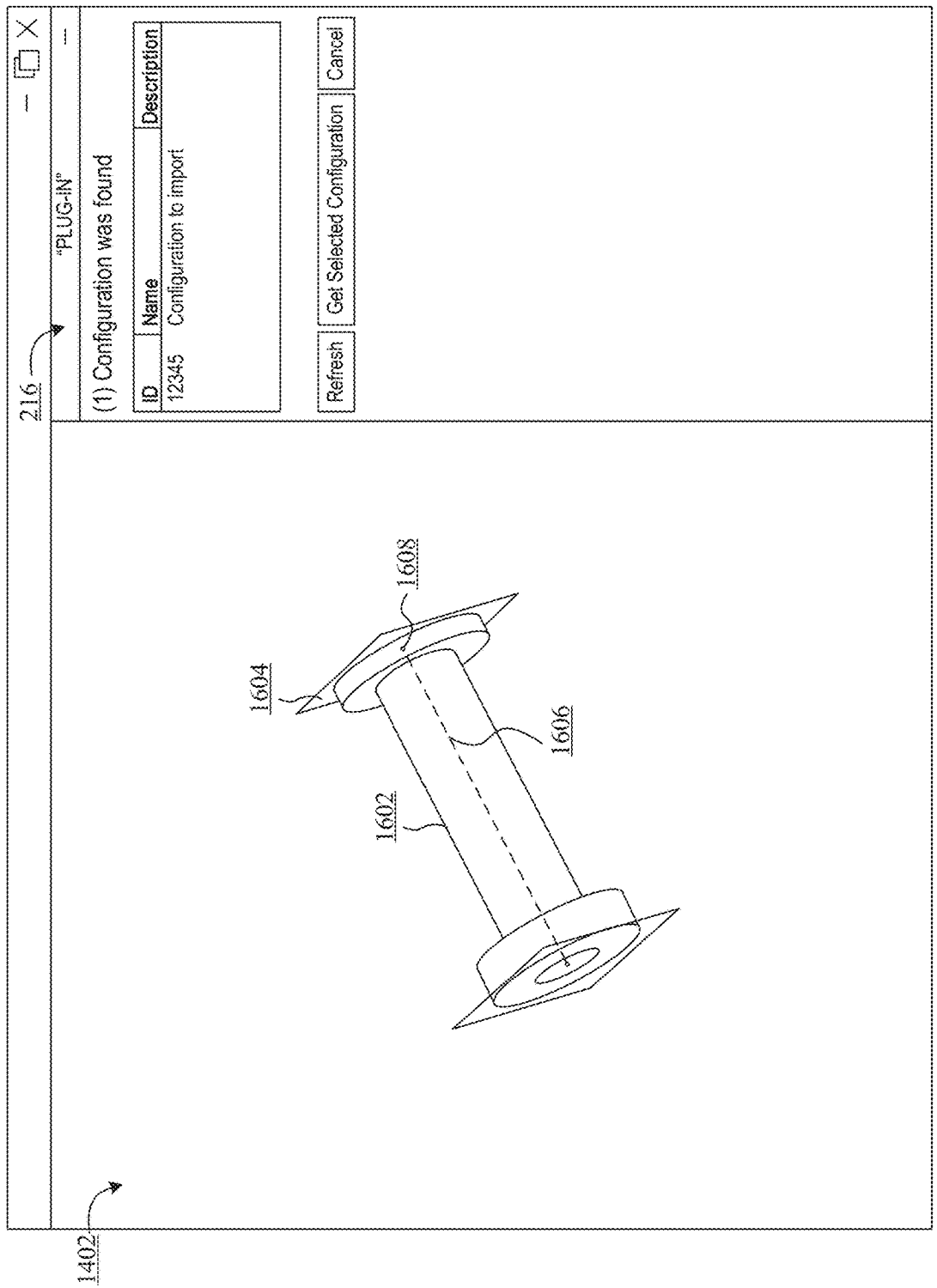
FIG. 16 is an exemplary view of a CAD software application, according to one aspect of the present disclosure.

In one embodiment, FIG. 16 is an exemplary view of a pipe part instance 1602. According to various aspects of the present disclosure, the pipe part instance 1602 may be a final version of the part instance 1502, such that the part instance 1602 is ready to be assembled. In particular embodiments, the part instance 1602 may include one or more planar surfaces 1604, one or more axes 1606, and one or more connector mates 1608. In various embodiments, the one or more planar surfaces, one or more axes, and one or more connector mates may define how the part instance 1602 may align with or connect to other parts.

Figure 17:
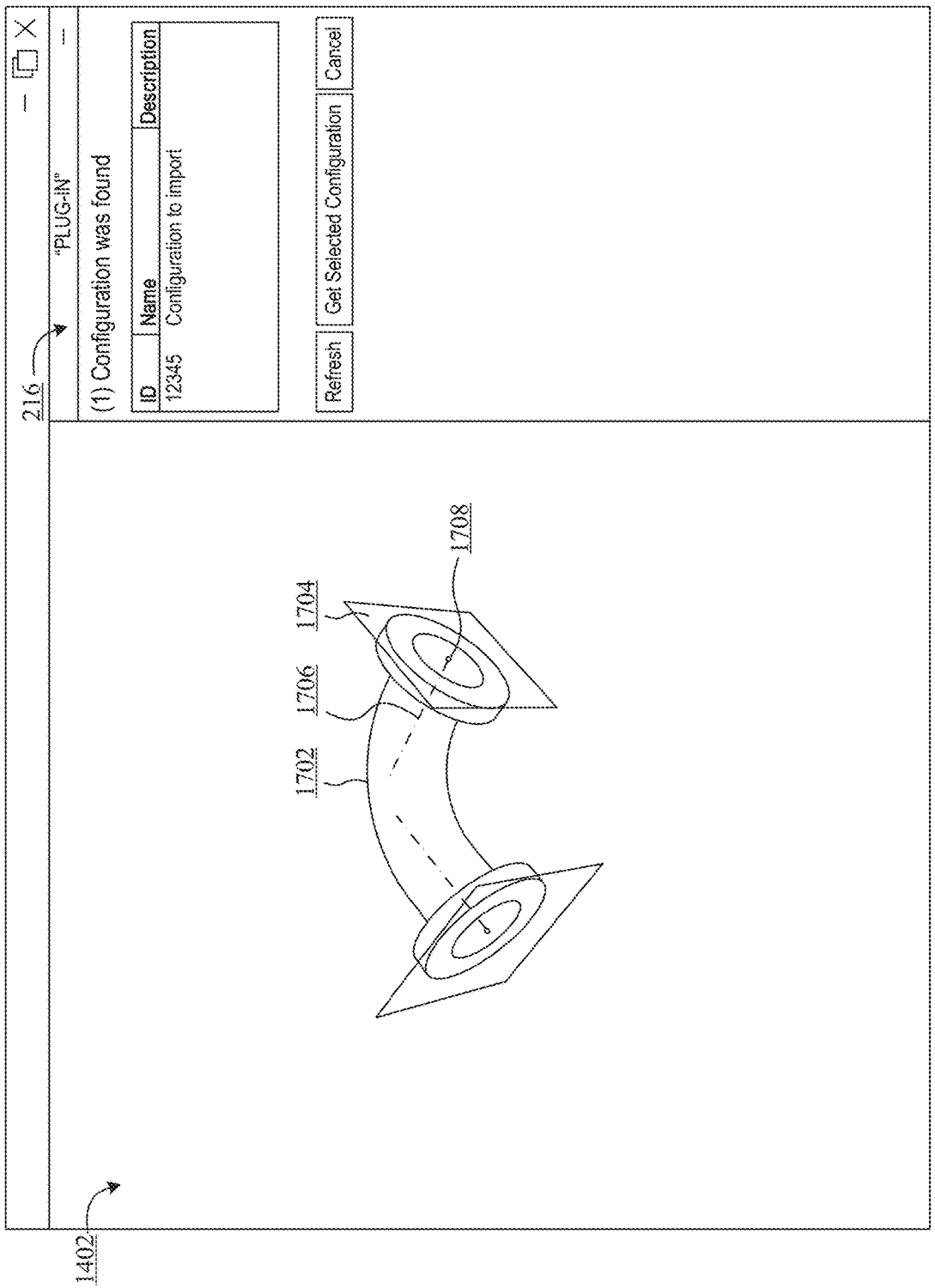
FIG. 17 is an exemplary view of a CAD software application, according to one aspect of the present disclosure.

Turning now to FIG. 17, an elbow part instance 1702 is shown within the CAD environment 1402, according to one aspect of the present disclosure. In various embodiments, and similarly to the pipe part instance 1602, the elbow part instance 1702 also includes one or more planar surfaces 1704, one or more axes 1706, and one or more connector mates 1708 defined by the master model of an elbow. In particular embodiments, the CAD plug-in 216 may automatically (and without human intervention) align and connect the pipe part instance 1602 with the elbow part instance 1702, as will be discussed below in association with the discussion of FIG. 18.

According to various aspects of the present disclosure, both the pipe part instance 1602 and the elbow part instance 1702 may be generated based on one or more master part models, and furthermore in response to instantiating particular instances of the master part models based on parameters of the configuration data. For example, configuration data represented in the CAD connector format may define the length of the pipe part instance 1602, the particular side of the elbow part instance 1702 that mates with the pipe part instance 1602, and the angle of rotation of the elbow part instance 1702 relative to the pipe part instance 1602, and the CAD plug-in may map this configuration data to the master part models such that the assembly is reconstructed to mirror or substantially resemble the original 3D configuration.

Figure 18:
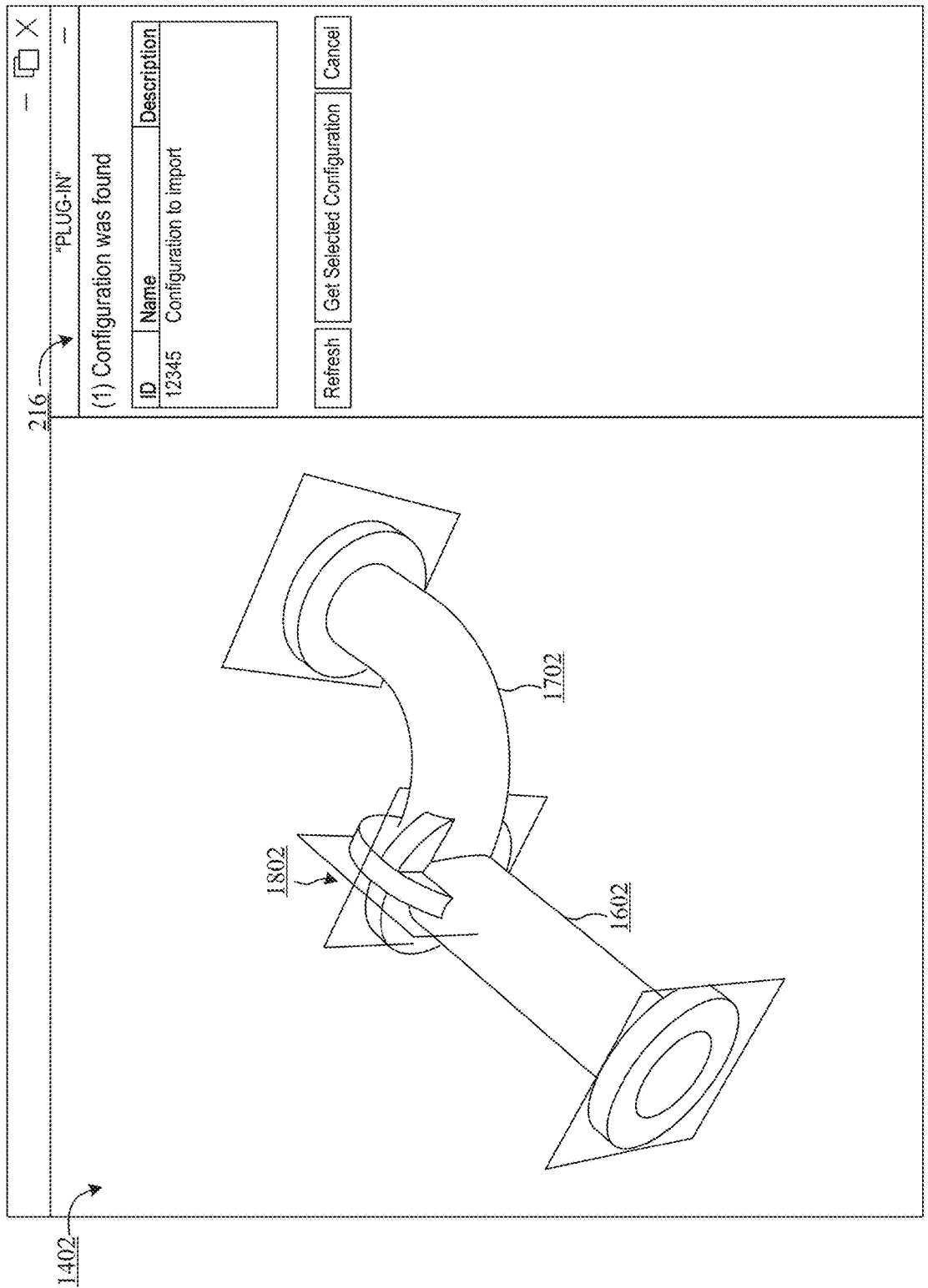
FIG. 18 is an exemplary view of a CAD software application, according to one aspect of the present disclosure.

In a particular embodiment, FIG. 18 illustrates an exemplary planar conflict during an automatic part instance assembly. As shown in the present embodiment, the pipe part instance 1602 and the elbow part instance 1702 have been automatically aligned/connected in such a way that a planar conflict 1802 has been introduced into the CAD environment 1402. In one embodiment, a planar conflict (such as the planar conflict 1802) occurs when two part instances, such as the pipe part instance 1602 and the elbow part instance 1702, are connected at connector points but experience intersecting or otherwise non-parallel planar surfaces. In certain embodiments, the CAD plug-in 216 may identify this planar conflict 1802 and furthermore automatically adjust the part instances, via a rotation, to resolve the planar conflict 1802 (shown at FIG. 19).

According to various aspects of the present disclosure, planar conflicts (such as the planar conflict 1802) are generally introduced in response to initially connecting two or more part instances. However, in certain embodiments, configuration data includes data defining orientations and rotations relative to adjacent objects. For example, the CAD connector format data for instantiating the elbow part instance 1702 may include data defining that the elbow part instance 1702 is to be rotated approximately 90 degrees along a horizontal axis to match the original assembly. Accordingly, after connecting the pipe part instance 1602 and the elbow part instance 1702 (at a defined connection point), the CAD plug-in may begin to rotate the elbow part instance 1802 to map to the information defined in the CAD connector format data. In certain embodiments, the CAD connector format data may define how each object is to be rotated in relation to its natural orientation (e.g., how it is originally displayed), such that the orientation data is not dependent on another object.

It should be understood from the discussion herein that a planar conflict, such as the planar conflict 1802, may exist in the CAD environment 1402 if any part instance has not been oriented as defined in the CAD connector format data, even if the current planes do not intersect (e.g., two objects may connect in a seemingly appropriate orientation, but this orientation is not consistent with the CAD connector format).

Figure 19:
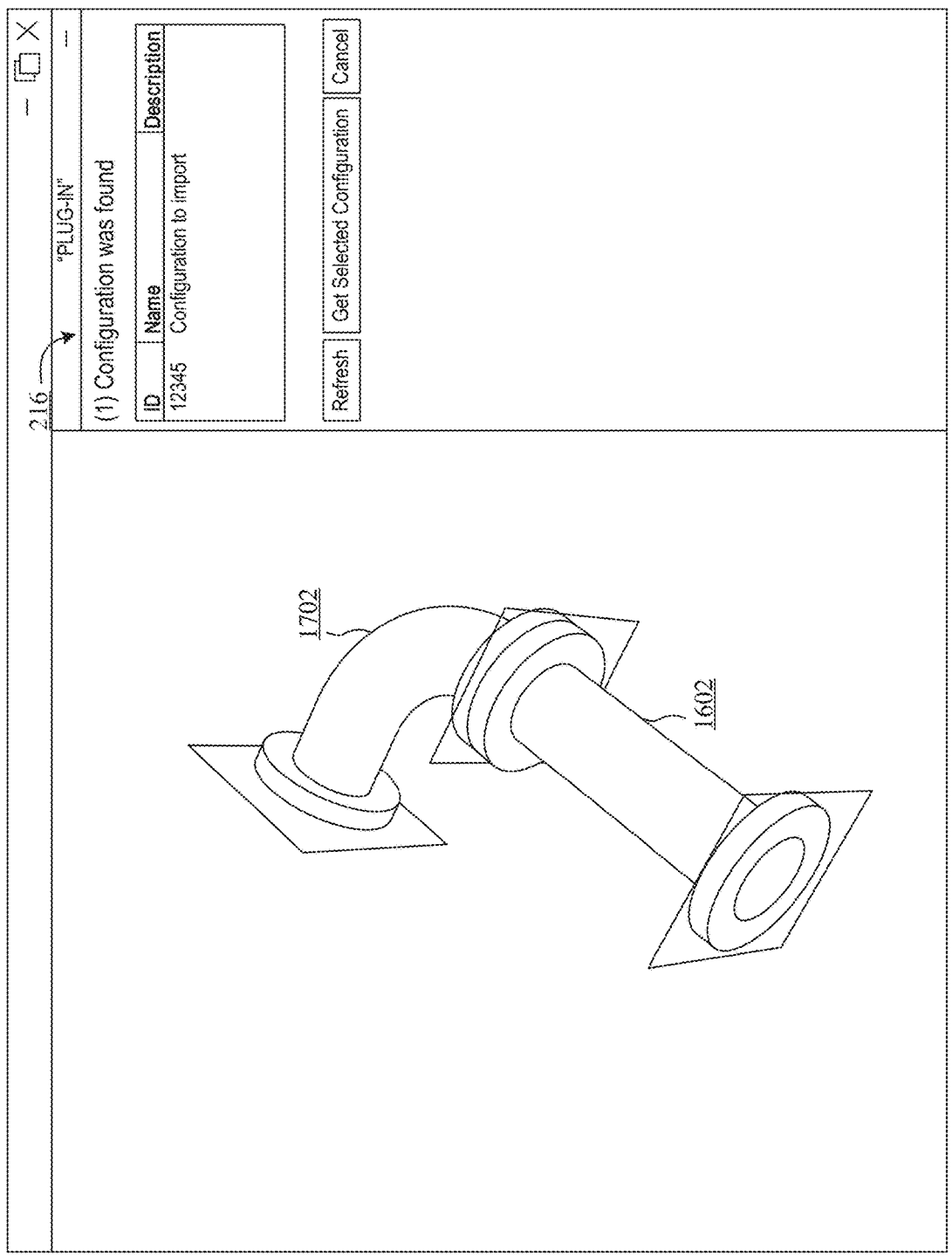
FIG. 19 is an exemplary view of a CAD software application, according to one aspect of the present disclosure.

Turning now to FIG. 19, the pipe part instance 1602 and elbow part instance 1702 are shown in a connected state without a planar conflict, according to one aspect of the present disclosure. As shown in the present embodiment, the planar surfaces of the part instances align in a way such that the planar surfaces match, and the part instances align just as they were assembled in the 3D configurator application 108. According to various aspects of the present disclosure, each part instance for a particular selected configuration may be built and assembled in this way.

Figure 20:
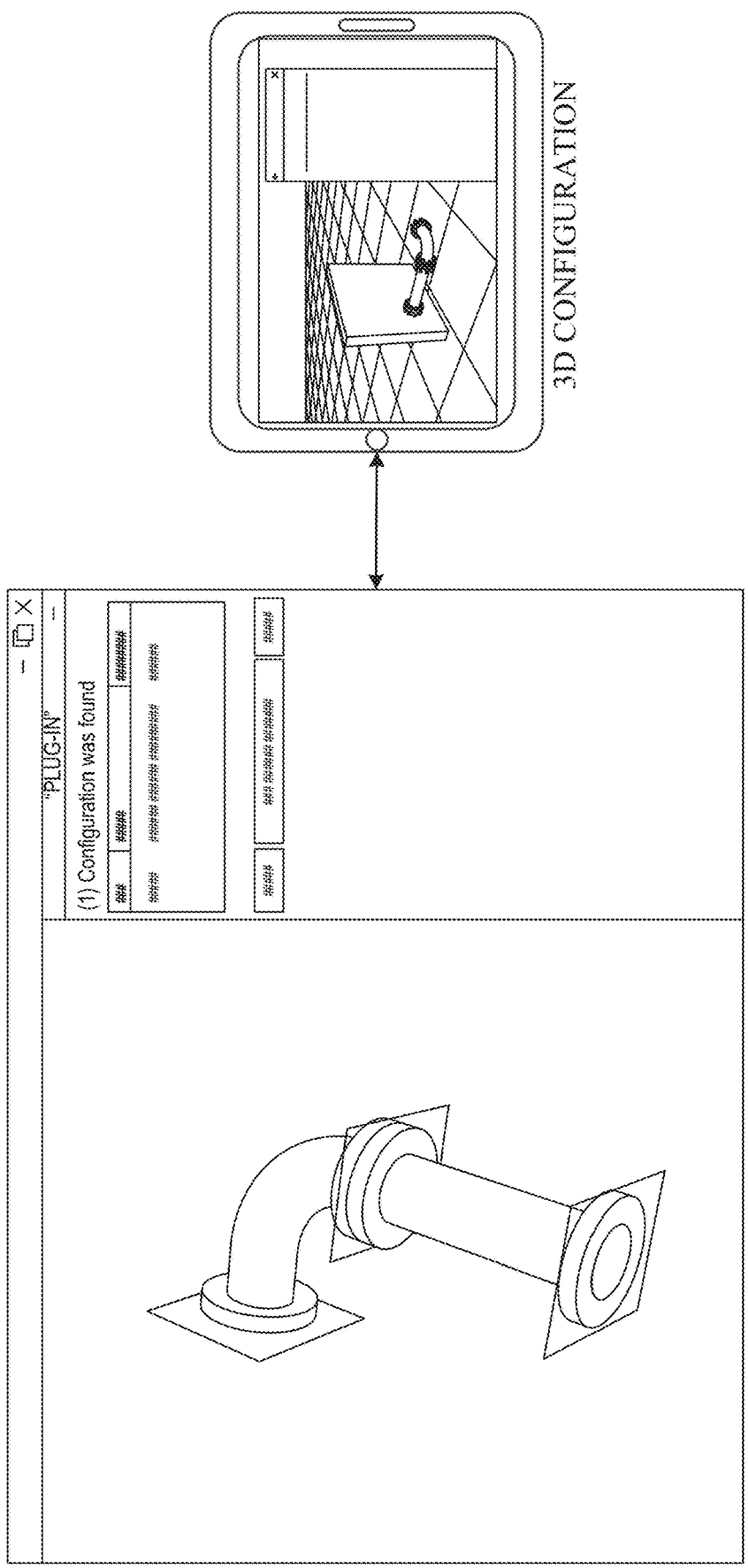
FIG. 20 illustrates an assembly transformation between the 3D configurator application and the CAD software application, according to one aspect of the present disclosure.

FIG. 20 illustrates an assembly transformation between the 3D configurator application and the CAD software application, according to one aspect of the present disclosure. As discussed herein, the present systems and methods allow for a user to create 3D configurations "on-the-fly" using a computing device such as a tablet. The user may select to save and export the 3D configurations, which further allows for the 3D configurations to be accessible by permitted CAD software applications. In various embodiments, the CAD software applications include plug-ins for consuming the 3D configuration data and transforming the 3D configuration data into a CAD connector format that can be used to generate the individual parts of the consumed 3D configurations. According to various aspects of the present disclosure, the CAD plug-in may also automatically connect and orient the generated instances of the individual parts, such that the assembly displayed in the CAD software application corresponds to the 3D configuration designed at the 3D configurator application. As shown in the present embodiment, the automatic CAD assembly may generate the "on-the-fly" 3D configuration, which may for the 3D configuration to be physically built (e.g., via a manufacturer, 3D printer, etc.).

Additional Exemplary Architecture Details/Embodiments

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions include, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Alternate Embodiments

As will be understood from discussions herein, the present systems and methods contemplate different embodiments not specifically described herein. For example, properties related to a particular product/part may be split into a number of components not discussed herein. For example, properties of a particular part/product may be split into less than three (e.g., two) or more than three (e.g., 4-10) different graphs or files.

As will be understood, the systems, methods, and processes discussed herein are not limited to pipes, pipe assemblies, or the like. Rather, various embodiments of the present systems and methods related generally to visual programming techniques and systems for disseminating data to mobile applications that can be used in many industries. For example, the visual programming embodiments discussed herein may be used for changing parameters of any suitable items or objects of a system (for example, parts related to manufacturing, automotive, and airline industries) and other programmable software objects, such as, for example, items or characters of a video game, dimensions or parameters of subsystems (e.g., utility subsystems that are part of a greater overall system), parameters of construction systems (e.g., building parameters, part parameters, location parameters, parameters of substructures, parameters of towers, utility lines, etc.) and the like. Similarly, the data dissemination architecture, techniques, systems, and processes are likewise applicable to any system where application updates may be necessary (not necessarily only part updates).

CONCLUSION

Aspects, features, and benefits of the claimed invention(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A method for automatically building an assembly in a CAD format, the method comprising:
    receiving at least one master part model comprising at least one master model dimension and at least one reference geometry associated with a particular part;
    receiving configurator data representing an assembly including the particular part, wherein the assembly is generated in a non-CAD user-interactive configurator application, the configurator data comprising at least one configurator dimension associated with the particular part and information defining a connection between the particular part and at least one other part in the assembly;
    modifying the configurator data by removing non-essential stylistic aspects from the configurator data to generate reduced configurator data;
    transforming the reduced configurator data to a platform agnostic data format;
    building a CAD version of the particular part, based on the platform agnostic data format of the reduced configurator data, by transforming the at least one configurator dimension into the at least one master model dimension; and
    building a CAD version of the assembly, based on the platform agnostic data format of the reduced configurator data, at least in part by connecting the CAD version of the particular part to a CAD version of the at least one other part in the assembly via the at least one reference geometry.

2. The method of claim 1, wherein receiving the configurator data representing the assembly comprises importing the configurator data from a cloud-based storage location associated with the non-CAD user-interactive configurator application.

3. The method of claim 2, wherein importing the configurator data from the cloud-based storage location requires user credentials.

4. The method of claim 1, wherein the reference geometry comprises a plane associated with a connection point of the particular part.

5. The method of claim 1, wherein the reference geometry comprises a plane normal.

6. The method of claim 1, wherein the reference geometry comprises an angle mate.

7. The method of claim 1, wherein the information defining a connection between the particular part and at least one other part in the assembly comprises an indication of an orientation of the particular part with respect to a reference point of the at least one other part.

8. The method of claim 7, the method further comprising displaying the particular part and the at least one other part in a CAD program.

9. The method of claim 8, the method further comprising displaying the particular part and the at least one other part in a natural orientation, wherein the natural orientation is an orientation of the particular part and the at least one other part as defined by the master model.

10. The method of claim 9, the method further comprising displaying at least one of the particular part and the at least one other part in a second orientation, wherein the second orientation varies from the natural orientation.

11. A system for automatically building an assembly in a CAD program, the system comprising:
    a connector plug-in operatively connected to at least one processor and to a CAD program, wherein the connector plug-in transforms configurator data into CAD program data, the connector plug-in configured for:
    receiving master part models for a plurality of parts from the CAD program, each master part model comprising one or more master part dimensions and one or more reference geometries;
    receiving configurator data associated with a configurator assembly, wherein the configurator assembly is generated in a non-CAD user-interactive configurator application, the configurator data comprising a particular part of the plurality of parts, at least one configurator dimension associated with the particular part, and information defining a connection between the particular part and at least one other part in the configurator assembly;
    modifying the configurator data by removing non-essential stylistic aspects from the configurator data to generate reduced configurator data;
    transforming the reduced configurator data to a platform agnostic CAD connector format;
    building a CAD version of the particular part, based on the platform agnostic CAD connector format of the reduced configurator data, by transforming the at least one configurator dimension into at least one master part dimension of the one or more master part dimensions; and
    automatically building a CAD assembly based on the platform agnostic CAD connector format of the reduced configurator data, in the CAD program substantially similar to the configurator assembly at least in part by connecting the CAD version of the particular part to a CAD version of the at least one other part in the configurator assembly via the at least one reference geometry.

12. The system of claim 11, wherein receiving configurator data associated with the configurator assembly comprises importing the configurator data from a cloud-based storage location associated with the non-CAD user-interactive configurator application.

13. The system of claim 12, wherein importing the configurator data from the cloud-based storage location associated with the configurator requires user credentials.

14. The system of claim 11, wherein the reference geometry comprises a plane associated with a connection point.

15. The system of claim 11, wherein the reference geometry comprises a plane normal.

16. The system of claim 11, wherein the reference geometry comprises an angle mate.

17. The system of claim 11, wherein a configurator mapping service builds the CAD version of the particular part by transforming the at least one configurator dimension into at least one master part dimension of the one or more master part dimensions.

18. The system of claim 11, wherein the connector plug-in is further configured for displaying the CAD version of the particular part and the CAD version of the at least one other part.

19. The system of claim 18, wherein the connector plug-in is further configured for displaying the CAD version of the particular part and the CAD version of the at least one other part in a natural orientation, wherein the natural orientation is an orientation of the CAD version of the particular part and the CAD version of the at least one other part as defined by the master part models.

20. The system of claim 19, wherein the connector plug-in is further configured for displaying at least one of the CAD version of the particular part and the CAD version of the at least one other part in a second orientation, wherein the second orientation varies from the natural orientation.

* * * * *